United States Patent
Yanai et al.

(10) Patent No.: US 10,310,260 B2
(45) Date of Patent: Jun. 4, 2019

(54) MEMBER FOR DISPLAYING PROJECTED IMAGE AND PROJECTION SYSTEM

(71) Applicant: FUJIFILM Corporation, Tokyo (JP)

(72) Inventors: Yujiro Yanai, Kanagawa (JP); Akira Yamamoto, Kanagawa (JP); Michio Nagai, Kanagawa (JP); Yukito Saitoh, Kanagawa (JP); Daisuke Kashiwagi, Kanagawa (JP); Nobuhiko Ichihara, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/819,533

(22) Filed: Nov. 21, 2017

(65) Prior Publication Data
US 2018/0074315 A1   Mar. 15, 2018

Related U.S. Application Data

(63) Continuation of application No. PCT/JP2016/002471, filed on May 20, 2016.

(30) Foreign Application Priority Data

May 29, 2015 (JP) ................................. 2015-110067
Dec. 25, 2015 (JP) ................................. 2015-252937

(51) Int. Cl.
*G02B 27/01* (2006.01)
*G03B 21/60* (2014.01)
(Continued)

(52) U.S. Cl.
CPC .......... *G02B 27/0101* (2013.01); *B60K 35/00* (2013.01); *G02B 5/26* (2013.01);
(Continued)

(58) Field of Classification Search
CPC .............................. G03B 21/602; G03B 21/60
(Continued)

(56) References Cited

U.S. PATENT DOCUMENTS

| 5,013,134 A | 5/1991 | Smith | |
|---|---|---|---|
| 2002/0085368 A1* | 7/2002 | Taniguchi | G02B 6/0036 362/601 |

(Continued)

FOREIGN PATENT DOCUMENTS

| JP | 2008-180798 A | 8/2008 |
|---|---|---|
| JP | 2008-269545 A | 8/2008 |

(Continued)

OTHER PUBLICATIONS

Machine translation of JP2014-071250 dated Apr. 2014.*
(Continued)

*Primary Examiner* — Christopher E Mahoney
(74) *Attorney, Agent, or Firm* — Birch, Stewart, Kolasch & Birch, LLP

(57) ABSTRACT

Provided is a member for displaying a projected image, including: a first base material; a second base material; and an optical member, in which at least one optical member is disposed on a surface of the first base material or the second base material, the optical member includes a plurality of cholesteric liquid crystal dots, the cholesteric liquid crystal dot is formed of a liquid crystal material having a cholesteric structure, the cholesteric structure imparts a striped pattern formed of bright portions and dark portions in a cross-sectional image of the cholesteric liquid crystal dot taken by a scanning electron microscope in a direction perpendicular to a substrate, the dot includes a portion where the height thereof successively increases to the maximum height thereof from an end portion toward the center thereof, an angle between a normal line with respect to a line formed by (Continued)

the first dark portion from the surface of the dot on a side opposite to the substrate and a line representing the surface of the is in a range of 70° to 90° in this portion of the cross-sectional image, and a reflection center wavelength of the dot is in a range of 400 to 1000 nm.

7 Claims, 6 Drawing Sheets

(51) Int. Cl.
  *G02B 5/26* (2006.01)
  *B60K 35/00* (2006.01)
  *G02F 1/137* (2006.01)
(52) U.S. Cl.
  CPC ......... *G02F 1/13718* (2013.01); *G03B 21/60* (2013.01); *B60K 2350/2052* (2013.01); *B60K 2350/921* (2013.01); *G02B 2027/0123* (2013.01)
(58) Field of Classification Search
  USPC ................................. 359/449, 459
  See application file for complete search history.

(56) References Cited

U.S. PATENT DOCUMENTS

| | | | |
|---|---|---|---|
| 2008/0182041 A1* | 7/2008 | Sekine | G02B 5/3016 428/29 |
| 2010/0078642 A1* | 4/2010 | Tano | H01L 51/0004 257/59 |
| 2010/0283774 A1* | 11/2010 | Bovet | G02B 27/017 345/211 |
| 2014/0307176 A1* | 10/2014 | Neumann | G02B 27/0149 349/11 |
| 2016/0245968 A1* | 8/2016 | Ichihara | G02B 5/26 |
| 2018/0052264 A1* | 2/2018 | Saitoh et al. | G02B 5/26 |

FOREIGN PATENT DOCUMENTS

| | | |
|---|---|---|
| JP | 4129275 B2 | 8/2008 |
| JP | 2008-221644 A | 9/2008 |
| JP | 2008-242758 A | 10/2008 |
| JP | 2008-242759 A | 10/2008 |
| JP | 2010-85532 A | 4/2010 |
| JP | 2014-71250 A | 4/2014 |
| WO | WO 2016/133223 A1 | 8/2016 |

OTHER PUBLICATIONS

International Preliminary Report on Patentability and Written Opinion of the International Searching Authority (Forms PCT/IB/373 and PCT/ISA/237) for International Application No. PCT/JP2016/002471, dated Dec. 5, 2017, with English translations.
International Search Report (Form PCT/ISA/210 ) for International Application No. PCT/JP2016/002471, dated Sep. 27, 2016, with English translation.
Okumura et al., "Wide Field of View Optical Combiner for Augmented Reality Head-up Displays," International Display Workshops, FMC4-1, 2014, pp. 389-392.
Japanese Notification of Reasons for Refusal for Japanese Application No. 2017-521676, dated Mar. 13, 2018, with Machine translation.
Japanese Office Action dated Jan. 8, 2019, for Japanese Patent Application No. 2017-521676, with machine translation.

* cited by examiner

MEMBER FOR DISPLAYING PROJECTED IMAGE AND PROJECTION SYSTEM

CROSS-REFERENCE TO RELATED APPLICATIONS

This application is a continuation application of International Application No. PCT/JP2016/002471, filed May 20, 2016, the disclosure of which is incorporated herein by reference in its entirety. Further, this application claims priority from Japanese Patent Application No. 2015-110067, filed May 29, 2015, and Japanese Patent Application No. 2015-252937, filed Dec. 25, 2015, the disclosures of which are incorporated herein by reference in their entirety.

BACKGROUND OF THE INVENTION

1. Field of the Invention

The present invention relates to a member for displaying a projected image and a projection system using the member for displaying a projected image.

2. Description of the Related Art

In a projected image display system, a video projected by a projector is displayed by a member for displaying a projected image. For example, in a head-up display system which is one of projection systems, a member for displaying a projected image having a function as a combiner which can simultaneously display a video to be projected and front scenery is used. In a head-up display system where windshield glass is used as such a member for displaying a projected image, a projected image is displayed by reflecting projection light on the front surface or the rear surface of glass or reflecting projection light by disposing a half mirror with a high transmittance.

SUMMARY OF THE INVENTION

Since the projection light displayed in the above-described manner is visually recognized mainly by specular reflection, the viewing angle range where a projected image can be visually recognized is extremely narrow.

For example, U.S. Pat. No. 5,013,134A proposes a method of forming a cross section of an intermediate film of windshield glass which is laminated glass into a wedge shape and allowing a reflected image from a glass plate on the outside to coincide with a reflected image from a glass plate on the inside, but the angle is extremely small. Therefore this method does not contribute to range expansion of the viewing angle.

Meanwhile, in a case where a transmission type screen member described in JP4129275B is used, it is expected that this member greatly contributes to expansion of the viewing angle range, but the front scenery appears to be blurred due to the haze caused by particle scattering.

Further, "Wide field of view Optical Combiner for Augmented Head-up Displays" (written by H. Okumura et al., International Display Workshops, 2014, FMC 4-1, pp. 389 to 392) describes that scattering due to surface unevenness is reduced and a high transmittance is obtained by disposing a resin layer on a Fresnel lens for matching the refractive index, but the contribution to expansion of the viewing angle range is small.

The present invention has been made in consideration of the above-described circumstances, and an object thereof is to provide a member for displaying a projected image which enables provision of a head-up display system with a wide viewing angle in projected image visibility and with a high transmittance and which has a high reflectivity of projection light in an oblique direction and a high transmittance. Another object of the present invention is to provide a projection system which can display a clear image with a high reflectivity and a high transmittance.

According to the present invention, there is provided a member for displaying a projected image, comprising: a first base material; a second base material; and an optical member, in which at least one optical member is disposed on a surface of the first base material or the second base material, the optical member includes a plurality of cholesteric liquid crystal dots provided on a substrate, the cholesteric liquid crystal dot is formed of a liquid crystal material having a cholesteric structure, the cholesteric structure imparts a striped pattern formed of bright portions and dark portions in a cross-sectional image of the cholesteric liquid crystal dot taken by a scanning electron microscope in a direction perpendicular to the substrate, the cholesteric liquid crystal dot includes a portion where the height thereof successively increases to the maximum height thereof from an end portion toward the center thereof, an angle between a normal line with respect to a line formed by the first dark portion from the surface of the cholesteric liquid crystal dot on a side opposite to the substrate and a line representing the surface of the cholesteric liquid crystal dot is in a range of 70° to 90° in the portion of the cross-sectional image, and a reflection center wavelength of the cholesteric liquid crystal dot is in a range of 400 to 1000 nm.

Further, the "reflection center wavelength" indicates a wavelength at the center of a wavelength bandwidth with the lowest reflectivity in the reflectivity spectrum of the cholesteric liquid crystal.

The optical member may be disposed on a surface of the first base material or the second base material directly or through another layer.

Typically, in a cholesteric liquid crystalline phase, a gradation image appearing in a half period of a helical pitch is visually recognized in a cross-sectional image (hereinafter, also referred to as a cross-sectional SEM image) taken by a scanning electron microscope (SEM). The "striped pattern formed of bright portions and dark portions" indicate "gradation in a cholesteric liquid crystal layer caused by distortion of a liquid crystal molecule in the cross-sectional SEM image of a cholesteric liquid crystal". In the present specification, a portion where the color is relatively pale is defined as a "bright portion" and a portion where the color is relatively dark is defined as a "dark portion".

Further, an "end portion of a dot" indicates an end portion of a dot in a region where the dot is in contact with a ground surface.

The "line formed by a dark portion" indicates a tangent in an arbitrary point on a line representing the surface of the dark portion in a cross-sectional SEM image.

Further, the "angle" indicates an angle of 90° or less, formed between a normal line with respect a line formed by a dark portion and a line representing the surface of a cholesteric liquid crystal dot. Here, the "line representing the dot surface" indicates a tangent in a point where the normal line and the line representing the dot surface intersect with each other in a cross-sectional SEM image. The details will be described later.

Further, it is preferable that the member for displaying a projected image of the present invention is windshield glass. In this case, it is preferable that the optical member is disposed between the first base material and the second base material, both of the first base material and the second base material are glass, the optical member has the cholesteric liquid crystal dots provided on the substrate, and the substrate is a resin film.

Further, it is preferable that the member for displaying a projected image of the present invention is used as a combiner of a head-up display.

According to the present invention, there is provided a projection system comprising: the member for displaying a projected image of the present invention, in which the cholesteric liquid crystal dots are disposed on a side where projection light is incident.

The member for displaying a projected image of the present invention includes a first base material; a second base material; and an optical member, in which at least one optical member is disposed on a surface of the first base material or the second base material, the optical member includes a plurality of cholesteric liquid crystal dots, each cholesteric liquid crystal dot is formed of a liquid crystal material having a cholesteric structure, the cholesteric structure imparts a striped pattern formed of bright portions and dark portions in a cross-sectional image of each cholesteric liquid crystal dot taken by a scanning electron microscope in a direction perpendicular to a substrate, each cholesteric liquid crystal dot includes a portion where the height thereof successively increases to the maximum height thereof from an end portion toward the center thereof, an angle between a normal line with respect to a line formed by the first dark portion from the surface of the cholesteric liquid crystal dot on a side opposite to the substrate and a line representing the surface of the cholesteric liquid crystal dot is in a range of 70° to 90° in the portion of the cross-sectional image, and a reflection center wavelength of each cholesteric liquid crystal dot is in a range of 400 to 1000 nm. With such a configuration, it is possible to provide a member for displaying a projected image and a projection system which have a high reflectivity of projection light that is incident on the member for displaying a projected image and a high transmittance.

DESCRIPTION OF THE PREFERRED EMBODIMENTS

Figure 1:
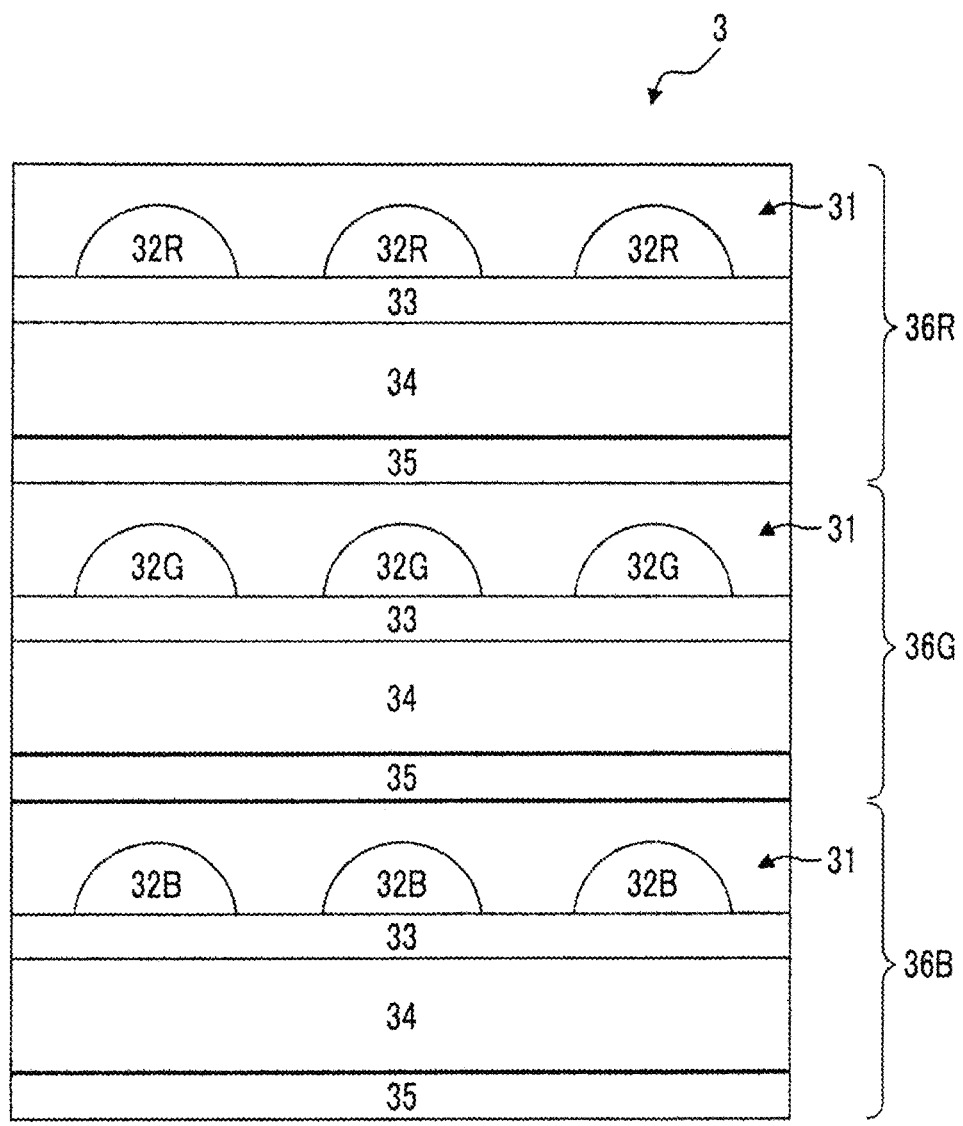
FIG. 1 is a cross-sectional view schematically illustrating an optical member according to an embodiment of the present invention.

First, a member for displaying a projected image of the present invention will be described.

<<Member for Displaying Projected Image>>

The member for displaying a projected image of the present invention includes a first base material; a second base material; and an optical member, in which at least one optical member is disposed on a surface of the first base material or the second base material, the optical member includes a plurality of cholesteric liquid crystal dots, each cholesteric liquid crystal dot is formed of a liquid crystal material having a cholesteric structure, the cholesteric structure imparts a striped pattern formed of bright portions and dark portions in a cross-sectional image of each cholesteric liquid crystal dot taken by a scanning electron microscope in a direction perpendicular to a substrate, each cholesteric liquid crystal dot includes a portion where the height thereof successively increases to the maximum height thereof from an end portion toward the center thereof, an angle between a normal line with respect to a line formed by the first dark portion from the surface of the cholesteric liquid crystal dot on a side opposite to the substrate and a line representing the surface of the cholesteric liquid crystal dot is in a range of 70° to 90° in the portion of the cross-sectional image, and a reflection center wavelength of each cholesteric liquid crystal dot is in a range of 400 to 1000 nm.

In the present specification, a member for displaying a projected image indicates a member which can display a projected image using reflection light and may be a member which can display a projected image projected from a projector or the like to be visible. Examples of the member for displaying a projected image include a projection screen and a half mirror for displaying a projected image. Examples of the half mirror for displaying a projected image include a combiner for a head-up display and windshield glass including a portion having the same combiner function.

The member for displaying a projected image of the present invention includes cholesteric liquid crystal dots. The member for displaying a projected image may include, in addition to the cholesteric liquid crystal dots, an antireflection layer, an alignment layer, a support, an adhesive layer, and layers of other base materials described below.

The member for displaying a projected image may be in the shape of a thin film, a sheet, a plate, or the like. The member for displaying a projected image may be in the shape of a flat surface, which does not include a curved surface, may include a curved surface, or may have a concave or convex shape as a whole and display the projected image in an enlarged or reduced size. In addition, the member for displaying a projected image may be combined with other members by adhering thereto and have the shapes described above, or may be in the shape of a roll or the like as a thin film before being combined.

It is preferable that the member for displaying a projected image has visible light-transmitting properties in order to enable information or scenery on a surface side opposite to the display surface to be observed. The member for displaying a projected image may have light transmittance of 40% or greater, preferably 50% or greater, more preferably 60% or greater, and still more preferably 70% or greater with respect to a wavelength range of visible light.

The haze of the member for displaying a projected member is preferably 15% or less, more preferably 10% or less, and still more preferably 7% or less.

Optical characteristics of the member for displaying a projected image with respect to ultraviolet light or infrared light other than the visible light range are not particularly limited, the member for displaying a projected image may transmit, reflect, or absorb the ultraviolet light or the infrared light, respectively. In order to prevent deterioration of the member for displaying a projected image, in order to perform heat insulation, in order to protect eyes of an observer, or the like, it is preferable that the member for displaying a projected image includes an ultraviolet light reflecting layer or an infrared light reflecting layer.

In the present specification, the "haze" is a value defined in JIS K 7136 and is measured using a haze meter NDH-2000 (manufactured by NIPPON DENSHOKU INDUSTRIES Co., Ltd.).

Further, the "transmittance" can be measured using the above-described haze meter or a spectrophotometer UV3150 (manufactured by SHIMADZU CORPORATION).

<Base Material>

The member for displaying a projected image of the present invention includes a first base material and a second base material. The first base material and the second base material are disposed on a side of the member for displaying a projected image where projection light is incident and a surface on a side opposite to the side where the projection light is incident. An optical member is disposed between the first base material and the second base material.

It is preferable that the first base material and the second base material are formed of glass, plastic, or the like.

In a case where the member for displaying a projected image of the present invention is used as a combiner of a head-up display, it is preferable that the first base material and the second base material are formed of glass or acryl.

<Optical Member>

Next, the optical member in the member for displaying a projected image of the present invention will be described.

The optical member in the member for displaying a projected image of the present invention includes a plurality of cholesteric liquid crystal dots (hereinafter, also referred to as dots). For example, an optical member formed by a plurality of dots being provided on a substrate may be exemplified.

Figure 2:
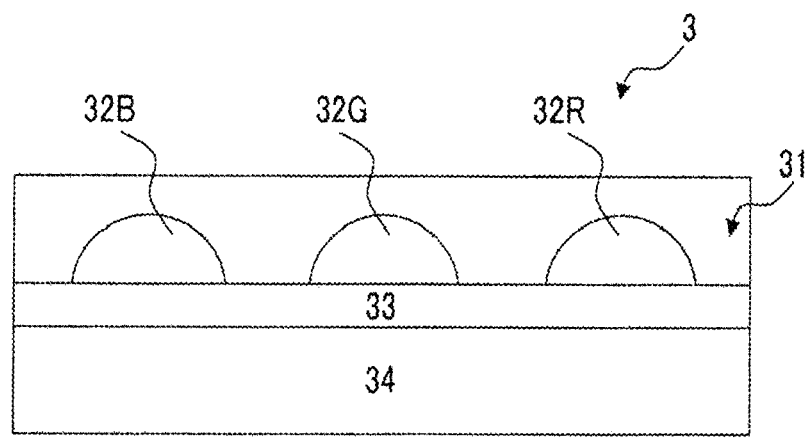
FIG. 2 is a cross-sectional view schematically illustrating an optical member according to another embodiment of the present invention.
Figure 3:
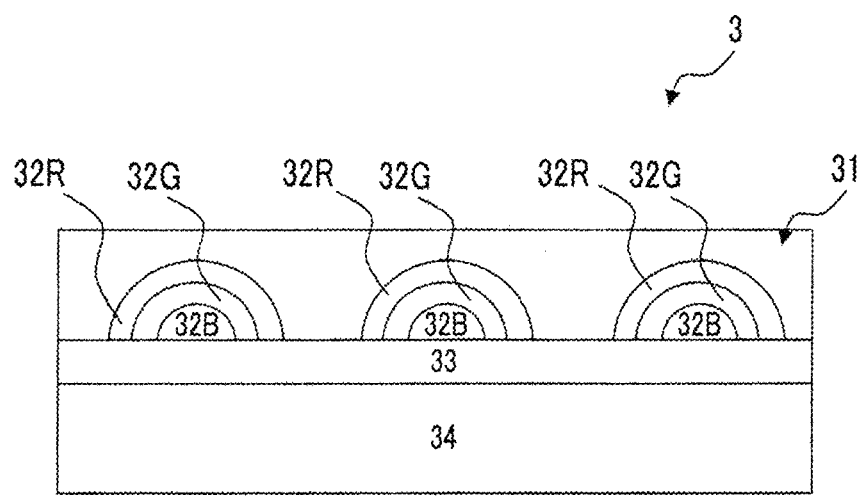
FIG. 3 is a cross-sectional view schematically illustrating an optical member according to still another embodiment of the present invention.

An embodiment of the optical member of the present invention will be described with reference to FIG. 1. FIG. 1 is a cross-sectional view schematically illustrating an optical member according to an embodiment of the present invention. FIG. 2 is a cross-sectional view schematically illustrating an optical member according to another embodiment of the present invention. FIG. 3 is a cross-sectional view schematically illustrating an optical member according to still another embodiment of the present invention.

As illustrated in FIG. 1, the optical member 3 of the present invention is an optical member formed by laminating a blue reflection member 36B which includes a substrate 34, a ground layer 33, a plurality of blue reflection cholesteric liquid crystal dots 32B provided on the ground layer 33, and an overcoat layer 31 on a pressure sensitive adhesive layer 35; a green reflection member 36G which has the same configuration as the blue reflection member 36B except that green reflection cholesteric liquid crystal dots 32G are provided in place of the blue reflection cholesteric liquid crystal dots 32B; and a red reflection member 36R which has the same configuration as the blue reflection member 36B except that red reflection cholesteric liquid crystal dots 32R are provided in place of the blue reflection cholesteric liquid crystal dots 32B.

Further, according to another embodiment, as illustrated in FIG. 2, a plurality of blue reflection cholesteric liquid crystal dots 32B, green reflection cholesteric liquid crystal dots 32G, and red reflection cholesteric liquid crystal dots 32R may be provided on the ground layer 33.

Furthermore, according to still another embodiment, as illustrated in FIG. 3, after a plurality of blue reflection cholesteric liquid crystal dots 32B are provided on the ground layer 33, green reflection cholesteric liquid crystal dots 32G and red reflection cholesteric liquid crystal dots 32R may be sequentially provided on the same region as the region where the blue reflection cholesteric liquid crystal dots 32B are provided.

Hereinafter, constituent elements of the optical member will be described.

(Substrate)

The substrate used for the optical member functions as a plane base material for forming dots on a surface.

It is preferable that the substrate has a low light reflectivity at a wavelength at which dots reflect light and also preferable that the substrate does not contain a material reflecting light at a wavelength at which dots reflect light.

It is preferable that the substrate is transparent in a visible light range. Further, the substrate may be colored, but it is preferable that the substrate is not colored or less colored. In addition, the refractive index of the substrate is preferably in a range of 1.2 to 2.0 and more preferably in a range of 1.4 to 1.8. This is because the visibility of an image to be displayed on a display is not degraded in an optical member or the like used on a viewing side of a transmission type display in a case where the coloration and the refractive index satisfy the description above.

The thickness of the substrate may be selected according to the application thereof and is not particularly limited, but may be in a range of 5 μm, to 1000 μm, preferably in a range of 10 μm, to 250 μm, and more preferably in a range of 15 μm, to 150 μm.

Examples of the substrate include glass, triacetyl cellulose (TAC), acryl, polycarbonate, polyvinyl chloride, polyolefin, polyethylene terephthalate (PET), and polyvinyl butyral. As an example of a multilayer substrate, a substrate obtained by laminating single layer substrates containing the above-described exemplary material may be exemplified.

Here, in a case where it is preferable that polarized light that has been circularly polarized is not changed by reflection using dots, a polymer resin material having a small birefringence such as glass, triacetyl cellulose (TAC), or acryl can be used. Specific examples of the polymer resin material include an acrylic resin (acrylic acid esters such as polymethyl (meth)acrylate), cyclic polyolefin such as polycarbonate, cyclopentadiene-based polyolefin, or norbornene-based polyolefin, polyolefins such as polypropylene, aromatic vinyl polymers such as polystyrene, polyarylate, and cellulose acrylate.

The birefringence of the substrate will be described. The birefringence of the substrate can be expressed as a relationship of "Re($\lambda$)/Rth($\lambda$)".

In the present specification, Re($\lambda$) and Rth($\lambda$) each represent an in-plane retardation at a wavelength $\lambda$ and a retardation in the thickness direction. The units thereof are both "nm". Re($\lambda$) is measured by allowing light having a wavelength of $\lambda$ nm to be incident in a film normal direction using "KOBRA 21ADH" or "WR" (both manufactured by Oji Scientific Instruments). In selection of a measurement wavelength of λ nm, measurement can be performed by manually exchanging a wavelength selective filter or by converting a measured value with a program or the like. In a case where the film to be measured is shown as a uniaxial or biaxial index ellipsoid, Rth(λ) is calculated according to the following method.

Rth(λ) is calculated by obtaining Re(λ) by setting a slow axis in the in-plane (determined using "KPBRA 21ADH" or "WR") as an inclined axis (rotation axis) (in a case where there is no slow axis, an arbitrary direction in the in-plane of the film is set as a rotation axis), allowing light having a wavelength of λ nm to be incident from directions inclined by 10° for each step up to 50° on one side from the normal direction with respect to the film normal direction, and measuring 6 points of the film in total. Subsequently, Rth(λ) is calculated using "KOBRA 21ADH" or "WR" based on the measured retardation values, the assumed average refractive index values, and the input film thickness values. In a case of a film having a direction in which the retardation value becomes zero at a certain inclination angle using the slow axis in the in-plane from the normal direction as a rotation axis, the retardation value at an inclination angle greater than the inclination angle is calculated using "KOBRA 21ADH" or "WR" after the symbol thereof is changed into negative.

Further, retardation values are measured from two directions arbitrarily inclined using a slow axis as an inclined axis (rotation axis) (in a case where there is no slow axis, an arbitrary direction in the in-plane of the film is set as a rotation axis), and Rth can be calculated according to Equations (A) and (B) based on the obtained values, the assumed average refractive index values, and the input film thickness value.

$$Re(\theta) = \left[ nx - \frac{(ny \times nz)}{\sqrt{\left(ny \sin\left(\sin^{-1}\left(\frac{\sin(-\theta)}{nx}\right)\right)\right)^2 + \left(nz \cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)}$$ Equation (A)

Further, Re(θ) represents a retardation value in a direction inclined at an angle θ from the normal direction. In addition, nx in Equation (A) represents a refractive index in a direction of a slow axis in the in-plane, ny represents a refractive index in a direction orthogonal to nx in the in-plane, and nz represents a refractive index in a direction orthogonal to nx and ny. d represents a film thickness.

$$Rth = ((nx+ny)/2 - nz) \times d$$ Equation (B)

In a case where the film to be measured is not shown as an uniaxial or biaxial index ellipsoid, in other words, in a case of a film that does not have a so-called optic axis, Rth(λ) is calculated according to the following method. Rth(λ) is calculated by obtaining Re(λ) described above by setting a slow axis in the in-plane (determined using "KPBRA 21ADH" or "WR") as an inclined axis (rotation axis), allowing light having a wavelength of λ nm to be incident from directions inclined by 10° for each step from −50° to +50° with respect to the film normal direction, and measuring 11 points of the film. Subsequently, Rth(λ) is calculated using "KOBRA 21ADH" or "WR" based on the measured retardation values, the assumed average refractive index values, and the input film thickness values. In the above-described measurement, as the assumed average refractive index values, values in Polymer Handbook (JOHN WILEY & SONS, INC.) and values in the catalog of various optical films can be used. In a case where the average refractive index values are not known, the values can be measured using an Abbe's refractometer.

Examples of the average refractive index values for main optical films include cellulose acylate (1.48), a cycloolefin polymer (1.52), polycarbonate (1.59), polymethyl methacrylate (1.49), and polystyrene (1.59). By inputting the assumed values and the film thicknesses of these average refractive indices, "KOBRA 21ADH" or "WR" calculates nx, ny, and nz. Further, "Nz=(nx−nz)/(nx−ny)" is further calculated based on the calculated values of nx, ny, and nz.

(Cholesteric Liquid Crystal Dots)

In the present invention, the cholesteric liquid crystal dots are obtained by jetting a liquid crystal composition exhibiting a cholesteric structure onto the substrate directly or through another layer such as a ground layer according to an inkjet system, drying the composition, performing an alignment treatment thereon, and then UV-curing the composition. It is preferable that a dot is Grandjean-aligned along the interface between the dot and air. This alignment can be made by adjusting the helical pitch in the cholesteric structure of a liquid crystal compound forming the dot. The reflection center wavelength of the dot is in a range of 400 nm to 1000 nm.

It is preferable that an overcoat layer is applied onto the dot. The haze due to the surface unevenness caused by the shape of the dot can be reduced. In this manner, since the characteristics caused by the cholesteric can be maintained with a low haze, an optical member having scattering properties while being highly transparent can be prepared.

In other words, with the tangent of the dot as the reflection surface, the incidence angle of projection light and the reflection angle of the reflection light becomes equal to each other. Since the inclination of the tangent of the dot changes according to the dot shape, the reflection light is reflected in various directions even in a case where the projection light is incident only at an angle which is substantially equal to the angle of parallel light so that the reflection light is reflected at a wide field of view.

In addition, due to the characteristics of the cholesteric liquid crystal, since light that transmits the film in spite of the dot shape is substantially parallel with incident rays, that is, since light is unlikely to refract so that the haze of the light is low, the scenery can be extremely clearly viewed without being blurred.

This point is different from a case of using glass or a half mirror or different from a case of using a scattering type transparent screen. In other words, the haze is low, but the reflection region is narrow since light is only specular reflected in the former case. Further, the reflection region is wide, but the haze is high in the latter case.

In the half-width Δλ (nm) of the reflection wavelength bandwidth (circular polarization reflection band) exhibiting selective reflection, $\Delta\lambda$ depends on birefringence $\Delta n$ of the liquid crystal compound and a pitch P described above and follows a relationship of "$\Delta\lambda=\Delta n \times P$". For this reason, the width of the selective reflection range can be controlled by adjusting $\Delta n$. $\Delta n$ can be adjusted by adjusting the type of polymerizable liquid crystal compound or a mixing ratio thereof or by controlling a temperature at the time of immobilizing alignment. The half-width of the reflection wavelength bandwidth is adjusted according to the applications of the optical member of the present invention. For example, in order to increase the transparency, it is preferable that the reflection wavelength bandwidth is narrow. In a case of intending to scatter the whole visible light, it is preferable that the reflection wavelength bandwidth is wide. The half-width $\Delta\lambda$ (nm) of the reflection wavelength bandwidth is not particularly limited, but may be in a range of 25 to 200 nm and preferably in a range of 50 to 100 nm.

—Dot Shape—

Figure 4:
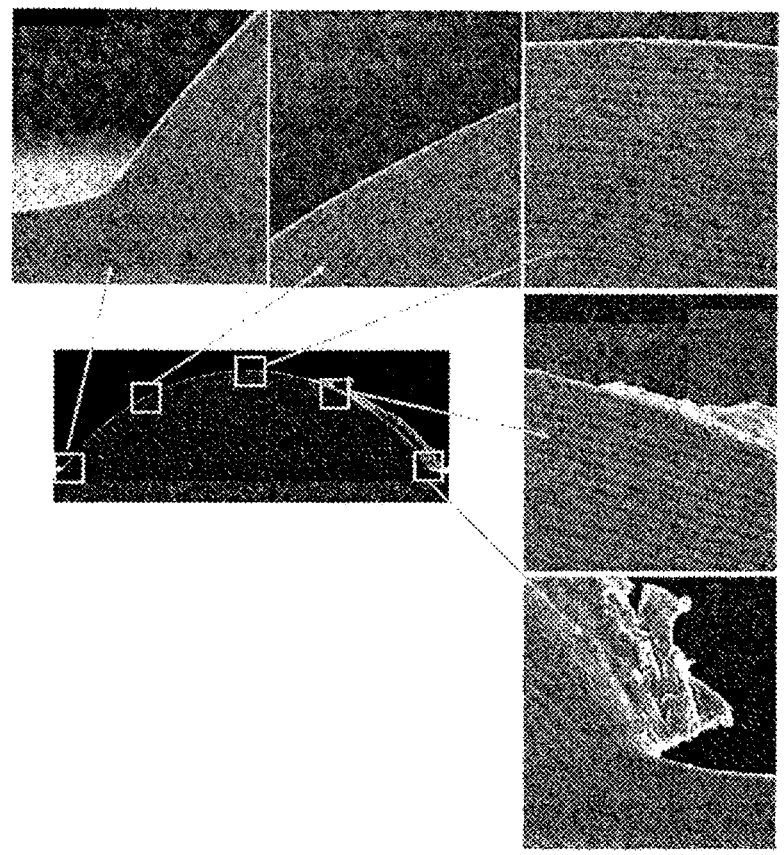
FIG. 4 is a cross-sectional photograph, taken by a scanning electron microscope (SEM), showing a cholesteric liquid crystal dot in a direction perpendicular to a substrate.
Figure 5:
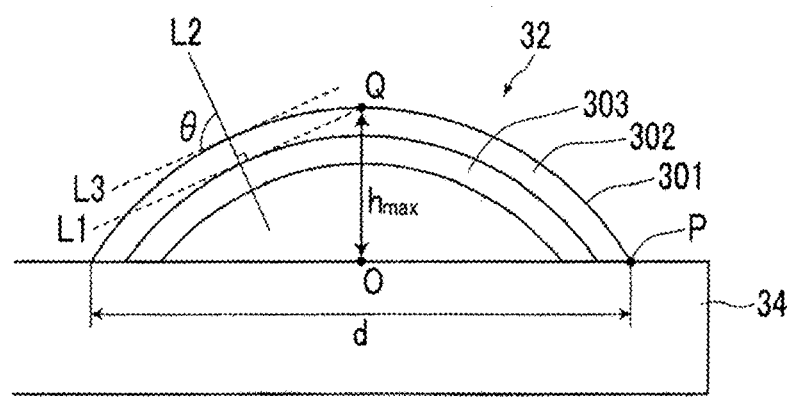
FIG. 5 is a cross-sectional view schematically illustrating a cholesteric liquid crystal dot in a direction perpendicular to a substrate.
Figure 6:
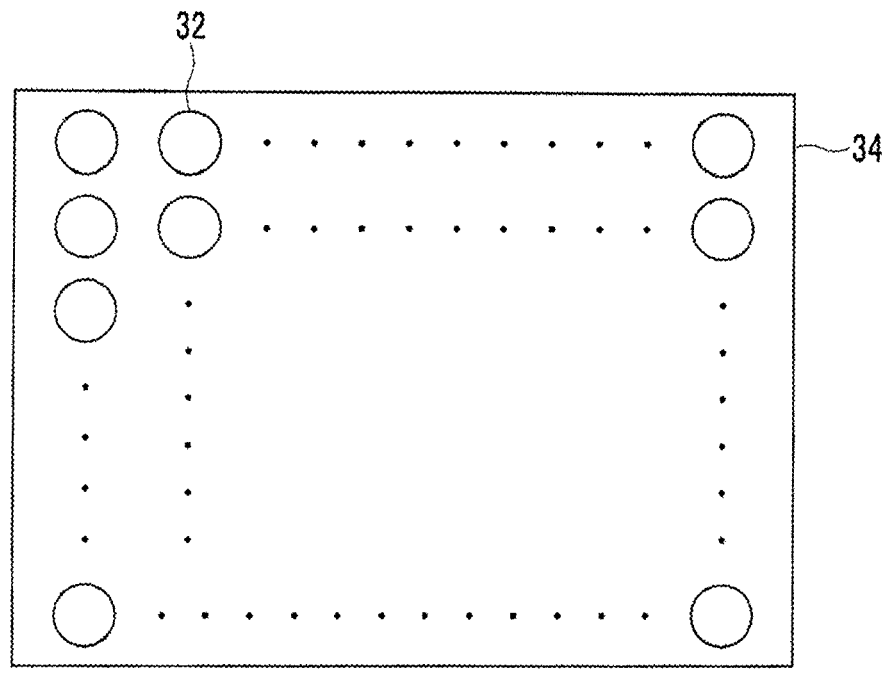
FIG. 6 is a top view schematically illustrating an optical element.
Figure 7:
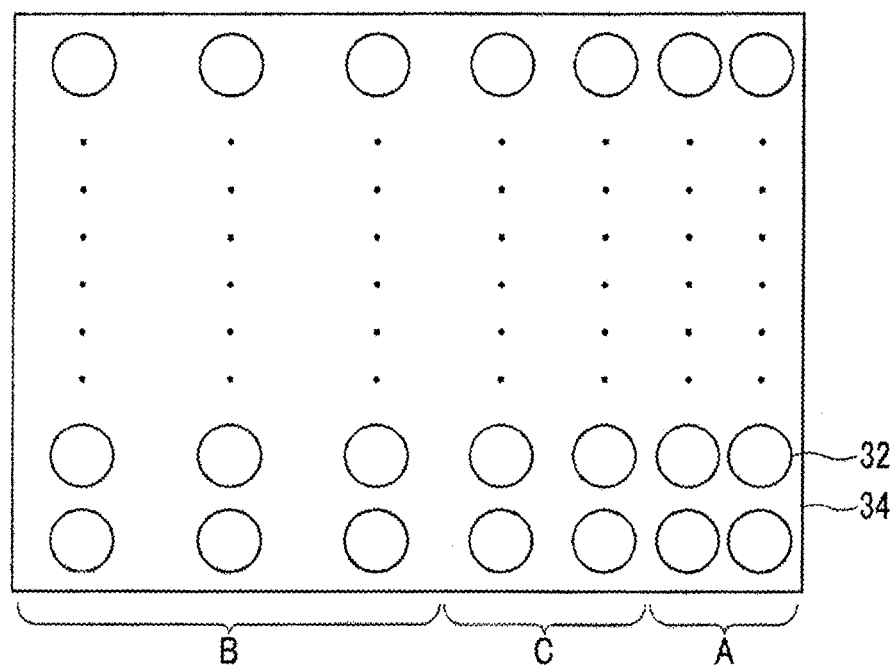
FIG. 7 is a top view schematically illustrating another arrangement example of cholesteric liquid crystal dots on an optical element.

Next, the dot shape will be described with reference to FIGS. 4 to 7. FIG. 4 is a cross-sectional photograph, taken by a scanning electron microscope, showing a cholesteric liquid crystal dot in a direction perpendicular to a substrate. FIG. 5 is a cross-sectional view schematically illustrating a cholesteric liquid crystal dot in a direction perpendicular to a substrate. FIG. 6 is a top view schematically illustrating an optical element. FIG. 7 is a top view schematically illustrating another arrangement example of cholesteric liquid crystal dots on an optical element.

As illustrated in FIG. 4, the cholesteric liquid crystal dot of the optical member of the present invention imparts a striped pattern in a cross-sectional SEM image of the cholesteric liquid crystal dot in a direction perpendicular to a substrate. The "striped pattern formed of bright portions and dark portions" indicate "gradation in a cholesteric liquid crystal layer caused by distortion of a liquid crystal molecule in the cross-sectional SEM image of a cholesteric liquid crystal". Typically, in a cholesteric liquid crystalline phase, a gradation image appearing in a half period of a helical pitch is visually recognized in a cross-sectional SEM image. A portion where the color is relatively pale is defined as a "bright portion" and a portion where the color is relatively dark is defined as a "dark portion".

Examples of the dot shape include a hemispherical or semi-elliptical shape obtained by setting the substrate side as a plane and a conical shape or an elliptical cone shape obtained by setting the substrate side as a bottom surface. Further, other examples thereof include shapes obtained by cutting the upper portions of these in approximately parallel with the substrate and flattening the upper portions.

In a case where the dot shape is a conical shape, the cross section perpendicular to the substrate has an approximately triangular shape. Further, the triangular shape may be symmetrical or asymmetrical. In a case where the directivity of incident rays greatly changes, it is preferable that the triangular shape is asymmetric.

Figure 9:
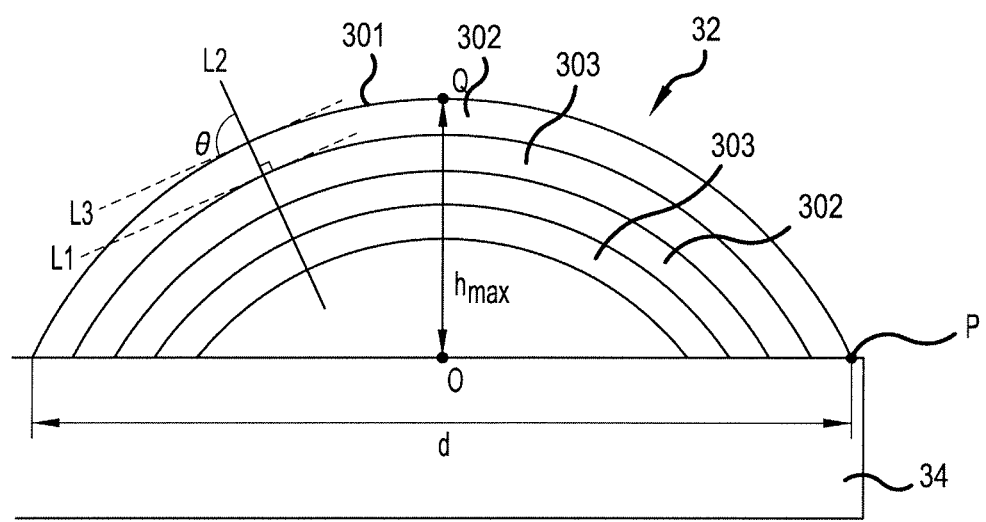
FIG. 9 is a cross-sectional view schematically illustrating a cholesteric liquid crystal dot in a direction perpendicular to a substrate with dark portions and bright portions.

The details of a cholesteric liquid crystal dot 32 will be described with reference to the schematic cross section of FIGS. 5 and 9. Further, a repeated structure formed of a plurality of bright portions and dark portions is partially omitted. In FIGS. 5 and 9, the cholesteric liquid crystal dot 32 is provided directly on the substrate 34, but may be provided indirectly by interposing another layer therebetween.

As illustrated in FIGS. 5 and 9, the cholesteric liquid crystal dot 32 of the present invention is provided on the substrate 34 in, for example, a semi-elliptical shape. The cholesteric liquid crystal dot 32 is formed of a liquid crystal material having a cholesteric structure and imparts a striped pattern formed of a bright portion 302 and a dark portion 303 in the cross-sectional SEM image.

Further, the cholesteric liquid crystal dot 32 includes a portion where the height thereof successively increases to a maximum height $h_{max}$ thereof from an end portion P toward a center O thereof. In other words, the dot 32 includes an inclined portion or a curved portion in which the height thereof increases toward the center O from the end portion P of the dot 32. In the present specification, the portion is also referred to as an inclined portion or a curved portion.

In this portion, an angle $\theta$ between a normal line L2 with respect to a line L1 formed by the first dark portion 303 from the surface 301 of the cholesteric liquid crystal dot 32 on a side opposite to the substrate 34 and a line L3 representing the surface of the cholesteric liquid crystal dot 32 is in a range of 70° to 90°.

Further, the cholesteric liquid crystal dot 32 may have a shape formed by laminating a plurality of dots (see FIG. 3). For example, dots capable of reflecting blue light, green light, and red light at a high density can be formed by laminating cholesteric layers having different reflection bandwidths at the same position.

In a case where dots are laminated, by laminating dots having different heights in a manner of deviating dots from the center of the dot on the underlayer, dots in which the envelope has an asymmetric triangular shape when seen from the cross-sectional direction and the directivity can be greatly changed as described above can be formed.

—Size of Dot—

As illustrated in FIGS. 5 and 9, a diameter d of a dot indicates a length of a portion where the dot is in contact with the substrate, and is preferably in a range of 10 to 300 µm and more preferably in a range of 20 to 200 µm. Here, the diameter d is obtained by measuring the direction of the dot using a scanning electron microscope and is set as a distance from one end portion to the other end portion. Further, in a case where the dot has an elliptical shape, the diameter d is set as an average value of the distance between end portions when observed from respective directions serving as a major axis and a minor axis.

The inclined portion or the curved portion may be present in the end portion in some directions or in the end portion in all directions when seen from the center of the dot. For example, in a case where the dot has a circular shape, the end portion corresponds to the circumference, and the inclined portion or the curved portion may be present in the end portion in some directions (for example, a portion corresponding to a length of 30% or greater, 50% or greater, or 70% or greater and 90% or less of the circumference) of the circumference or may be in the end portion in all directions (for example, a portion corresponding to a length of 90% or greater, 95% or greater, or 99% or greater of the circumference) of the circumference. It is preferable that the end portion of the dot corresponds to the whole circumference. In other words, it is preferable that a change in height in a direction toward the circumference from the center of the dot is the same in all directions. Further, it is preferable that optical properties such as retroreflectivity described below and properties described in the cross-sectional views are the same in all directions from the center of the dot toward the circumference.

The inclined portion or the curved portion may be present at a constant distance starting from the end portion P (an edge or a boundary portion of the circumference) of the dot 32 and not reaching the center O, may be present in a range starting from the end portion P of the dot 32 to the center O, may be present at a constant distance starting from a portion at a constant distance from the end portion P of the dot 32 and not reaching the center O, or may be present in a range starting from a portion at a constant distance from the end portion P of the dot 32 to the center O.

—Height of Dot—

The height of the dot is preferably in a range of 10 to 150 µm and more preferably in a range of 20 to 100 µm.

In the present specification, the "height" of the dot indicates the "shortest distance from the point on the surface of the dot on the opposite side of the substrate to the surface of the substrate where dots are formed. At this time, the surface of the dot may be an interface between the dot and another layer. Further, in a case where the substrate has unevenness, extension of the substrate surface at the end portion of the dot is set as the surface on a side where dots are formed. The maximum height indicates the maximum value of the height and is the shortest distance from the vertex of the dot to the surface of the substrate where dots are formed.

A point Q on the dot surface imparting a maximum height $h_{max}$ of the dot may be at the vertex in a hemispherical shape or in a conical shape or may be on the surface which has been cut and flattened in approximately parallel with the substrate 34 as described above. It is also preferable that all flattened surface-like points impart the maximum height of the dot. It is also preferable that the center O of the dot may impart the maximum height.

The angle between the substrate 34 (surface of the substrate on a side where dots are formed) and the surface 301 of the dot on a side opposite to the substrate 34, that is, a so-called contact angle is not particularly limited, but is preferably in a range of 10° to 70° and more preferably in a range of 20° to 60°. The contact angle can be measured using an automatic contact angle meter "CA-V series" (manufactured by Kyowa Interface Science Co., Ltd.). For example, the contact angle can be obtained by performing measurement in three levels and calculating the average value thereof.

—Density of Dot—

FIG. 6 is a top view illustrating a portion of an optical element. Further, in FIG. 6, the cholesteric liquid crystal dot 32 is provided directly on the substrate 34, but may be indirectly provided by interposing another layer therebetween. As illustrated in FIG. 6, a plurality of dots 32 are provided on the substrate 34. The plurality of dots 32 are formed close to each other on the surface on the surface, and the occupancy rate of the dots 32 may be 50% or greater, 60% or greater, or 70% or greater of the surface area of the substrate 34 on a side where dots are formed. It is preferable that the occupancy rate is high because the luminance is increased. From the viewpoint of forming dots 32 close to each other, the occupancy rate is preferably 98% or less. In this case, the optical characteristics such as selective reflectivity of the dots 32 may practically be optical characteristics of the entire optical member and particularly the entire surface where dots are formed.

Here, in a case where the area of the entire range to be observed is set as S, the area of one dot is set as A, and the number of dots is set as N, the occupancy rate is calculated by an equation of "Occupancy rate=(A×N)/S" in a case where the surface on a side where dots are formed is measured at a magnification at which the plurality of dots 32 are measured using an optical microscope.

In addition, the plurality of dots 32 are formed by being separated from each other on the surface of the substrate 34, and the occupancy rate of the dots 32 may be less than 50%, 30% or less, or 10% or less of the surface area of the substrate 34 on a side where dots are formed. In this case, the optical characteristics of the optical member on the surface side where dots are formed can be confirmed as the contrast between the optical characteristics of the substrate 34 and the optical characteristics of the dots 32.

A plurality of dots may be formed regularly or randomly.

For example, in a case where a plurality of dots respectively having a diameter of 20 to 200 µm are formed, any square shape having a size of 2 mm square in the surface of the substrate includes an average of 10 to 1000 dots, preferably 15 to 800 dots, and more preferably 20 to 600 dots. At this time, it is also preferable that dots having reflection bandwidths different from each other are adjacently disposed. One set of dots having each one of reflection bandwidths different from each other is referred to as a dot group. A dot group can be represented by a circle including each dot, and the diameter of the dot group is only required to have each one of the above-described dots. The diameter of the dot group is preferably in a range of 40 µm to 100 µm.

Further, as illustrated in FIG. 7, the dots 32 may have a density distribution in the surface of the substrate 34. For example, the dot density in an A region in the vicinity of one end portion on the substrate 34 is greater than the dot density of a B region in the vicinity of the other end portion, and the dot density of a C region between the A region and the B region may change continuously or stepwisely. Specifically, the number of dots in the vicinity (for example, 1 mm×1 mm) of one end portion in the surface of the substrate (100 mm×100 mm) is an average of 20 to 100 and the number of dots in the vicinity of the other end portion (for example, 1 mm×1 mm) is an average of 50 to 500.

In a case where a plurality of dots are present on the surface of the substrate, the diameters and the shapes of the dots may be the same as or different from each other.

The shape, the diameter, the length, and the angle of each dot, the number of dots, and the distance between dots can be confirmed using images obtained by a laser microscope, a scanning electron microscope (SEM), a transmission electron microscope (TEM), and an optical microscope.

—Cholesteric Structure—

It has been known that the cholesteric structure exhibits selective reflectivity at a specific wavelength. The center wavelength (reflection center wavelength) $\lambda$ of selective reflection depends on the pitch P (=a cycle of a helix) of a helical structure in the cholesteric structure and follows a relationship between an average refractive index n of the cholesteric liquid crystal and "$\Delta\lambda=\Delta n \times P$". Therefore, the reflection center wavelength can be adjusted by adjusting the pitch of the helical structure. Since the pitch of the cholesteric liquid structure depends on the type of chiral agent used along with the polymerizable liquid crystal compound or the addition concentration thereof, a desired pitch can be obtained by adjusting the type of chiral agent or the addition concentration thereof. Further, the preparation of a pitch is specifically described in Fujifilm Research Report No. 50 (2005), pp. 60 to 63. Furthermore, methods described in "Introduction to Liquid Crystal Chemical Test", pp. 46, edited by Japan Liquid Crystal Society, published by Sigma Publications, 2007, and "Liquid Crystal Handbook", pp. 196, Liquid Crystal Handbook Editing Committee Maruzen can be used as a measurement method of the sense of the helix or the pitch.

The cholesteric structure imparts a striped pattern formed of bright portions and dark portions in a cross-sectional image of each dot taken by a scanning electron microscope in a direction perpendicular to a substrate. Two times of repetitions of bright portions and dark portions (two bright portions and two dark portions) correspond to one helical pitch. Therefore, the pitch can be measured from the SEM cross-sectional view. The normal line with respect to each line of the striped pattern corresponds to a helical axis direction.

—Cholesteric Structure in Dot—

In a case where the inclined portion or the curved surface portion of a dot is confirmed using a cross-sectional image observed by a scanning electron microscope, the angle between a normal line with respect to a line formed by the first dark portion from the surface of the dot on a side opposite to the substrate and the surface of the cholesteric liquid crystal dot is not limited, but the angle varies depending on the application of the member for displaying a projected image. In a case where the angle is small, the scattering properties become excellent. In a case where the angle is large, the amount of specular reflection component or retroreflective component is increased.

In a case where the surface in the cross-sectional view is a curved line, the angle between a normal line with respect to a line formed by the first dark portion from the surface of the cholesteric liquid crystal dot and a line representing the surface of the dot indicates an angle from the tangent of the surface. In the cross-sectional view, it is preferable that the angles between the normal lines with respect to the lines formed by the second dark portion from the surface of the dot on a side opposite to the substrate and the line representing the surface are the same as each other, more preferable that the angles between the normal lines with respect to the lines formed by the third to fourth dark portion from the surface of the dot on a side opposite to the substrate and the line representing the surface are the same as each other, and still more preferable that the angles between the normal lines with respect to the lines formed by the fifth to twelfth or higher dark portion from the surface of the dot on a side opposite to the substrate and the line representing the surface are the same as each other.

—Method of Preparing Cholesteric Structure—

The cholesteric structure can be obtained by fixing a cholesteric liquid crystalline phase. The structure obtained by fixing the cholesteric liquid crystalline phase may be a structure in which alignment of a liquid crystal compound formed of the cholesteric liquid crystalline phase is retained, and typically may be a structure in which a polymerizable liquid crystal compound is set to be in an alignment state of the cholesteric liquid crystalline phase and is subjected to ultraviolet ray irradiation, heating, or the like by polymerization and curing, and thus, a layer which does not have fluidity is formed and is simultaneously changed to a state where a change does not occur in an alignment mode due to an external field or an external force. Furthermore, in the structure obtained by fixing the cholesteric liquid crystalline phase, it is sufficient that optical properties of the cholesteric liquid crystalline phase are retained in the layer, and the liquid crystal compound of the layer may no longer exhibit liquid crystallinity. For example, the polymerizable liquid crystal compound may have a high molecular weight by a curing reaction, and may no longer have liquid crystallinity.

Examples of the material used for forming the cholesteric structure include a liquid crystal composition containing a liquid crystal compound. It is preferable that the liquid crystal compound is a polymerizable liquid crystal compound.

A liquid crystal composition containing a polymerizable liquid crystal compound further contains a surfactant. The liquid crystal composition may further contain a chiral agent and a polymerization initiator.

—Polymerizable Liquid Crystal Compound—

The polymerizable liquid crystal compound may be a rod-like liquid crystal compound, or a disk-like liquid crystal compound, and it is preferable that the polymerizable liquid crystal compound is a rod-like liquid crystal compound.

Examples of a rod-like polymerizable liquid crystal compound forming the cholesteric liquid crystal layer include a rod-like nematic liquid crystal compound. Azomethines, azoxys, cyanobiphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolans, and alkenyl cyclohexyl benzonitriles are preferably used as the rod-like nematic liquid crystal compound. Not only a low molecular liquid crystal compound but also a high molecular liquid crystal compound can be used.

The polymerizable liquid crystal compound can be obtained by introducing a polymerizable group into a liquid crystal compound. Examples of the polymerizable group include an unsaturated polymerizable group, an epoxy group, and an aziridinyl group, and an unsaturated polymerizable group is preferable, and an ethylenically unsaturated polymerizable group is particularly preferable. The polymerizable group can be introduced into the molecules of the liquid crystal compound by various methods. The number of polymerizable groups of the polymerizable liquid crystal compound is preferably in a range of 1 to 6 and more preferably in a range of 1 to 3. Examples of the polymerizable liquid crystal compound include compounds described in Makromol. Chem., Vol. 190, Page 2255 (1989), Advanced Materials Vol. 5, Page 107 (1993), the specifications of U.S. Pat. Nos. 4,683,327A, 5,622,648A, and 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), JP2001-328973A, and the like. Two or more types of polymerizable liquid crystal compounds may be combined. In a case where two or more types of polymerizable liquid crystal compounds are combined, it is possible to decrease an alignment temperature.

Specific examples of the polymerizable liquid crystal compound include compounds represented by Formulae (1) to (11).

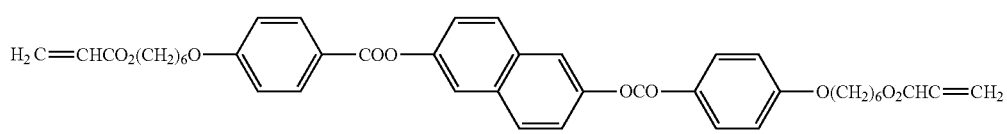

(1)

-continued

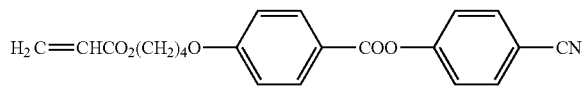
(2)

(3)

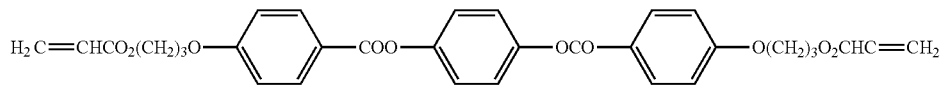
(4)

(5)

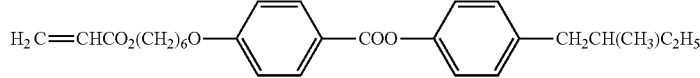
(6)

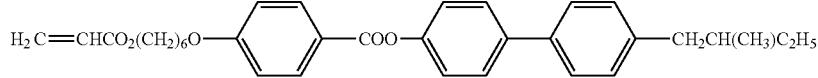
(7)

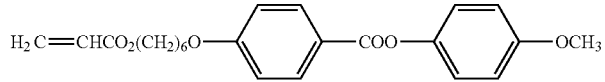
(8)

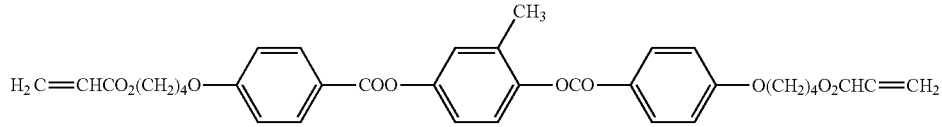
(9)

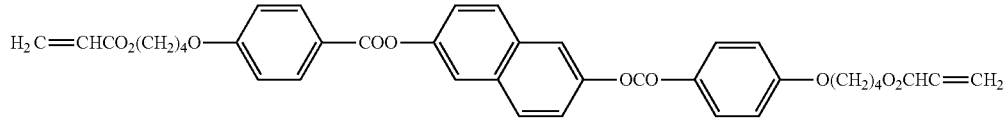
(10)

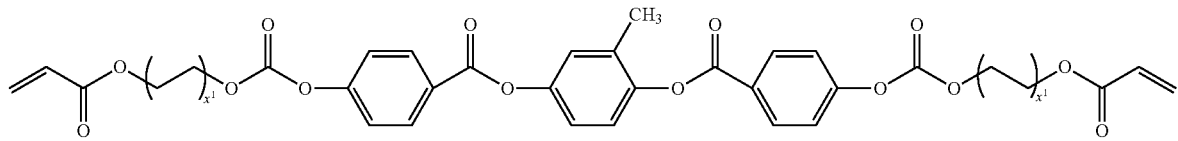
(11)

[In the compound (11), $X^1$ represents an integer of 2 to 5.]

As polymerizable liquid crystal compounds other than those described above, a cyclic organic polysiloxane compound and the like having a cholesteric phase, disclosed in JP1982-165480A (JP-S57-165480A), can be used. Further, as the polymer liquid crystal compound described above, a polymer obtained by introducing a mesogen group exhibiting liquid crystals into a main chain or a side chain or both of the main chain and the side chain; a polymer cholesteric liquid crystal obtained by introducing a cholesteryl group into a side chain, a liquid crystalline polymer disclosed in JP1997-133810A (JP-H09-133810A), and a liquid crystalline polymer disclosed in JP1999-293252A (JP-H11-293252A) can be used.

The amount of the polymerizable liquid crystal compound to be added to the liquid crystal composition is preferably in a range of 75% to 99.9% by mass, more preferably in a range of 80% to 99% by mass, and particularly preferably in a range of 85% to 90% by mass with respect to the mass (mass excluding the solvent) of the solid content in the liquid crystal composition.

—Surfactant—

According to the present inventors, it is preferable that the polymerizable liquid crystal compound is horizontally aligned on the air interface side at the time of dot formation by adding a surfactant to the liquid crystal composition used for dot formation and the helical axis direction is controlled as described above. As a surfactant, a compound capable of functioning as an alignment control agent that contributes to stably or rapidly obtaining a cholesteric structure of planar alignment is preferable. As the surfactant, a silicone-based surfactant and a fluorine-based surfactant are exemplified. Among these, a fluorine-based surfactant is preferable.

Specific examples of the surfactant include compounds described in paragraphs [0082] to [0090] of JP2014-119605A; compounds described in paragraphs [0031] to

[0034] of JP2012-203237A; compounds described in paragraphs [0092] and [0093] of JP2005-99248A; compounds described in paragraphs [0076] to [0078] and [0082] to [0085] of JP2002-129162A; and a fluorine (meth)acrylate-based polymer described in paragraphs [0018] to [0043] of JP2007-272185A.

Further, the horizontal alignment agent may be used alone or in combination of two or more kinds thereof.

As the fluorine-based surfactant, compounds represented by Formula (I) described in [0082] to [0090] of JP2004-119605A are particularly preferable.

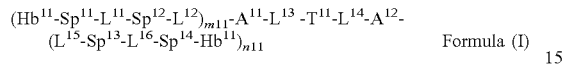

In Formula (I), $L^{11}$, $L^{12}$, $L^{13}$, $L^{14}$, $L^{15}$, and $L^{16}$ each independently represent a single bond, —O—, —S—, —CO—, —COO—, —OCO—, —COS—, —SCO—, —NRCO—, or —CONR— (R in Formula (I) represents a hydrogen atom or an alkyl group having 1 to 6 carbon atoms). —NRCO— and —CONR— have effects of decreasing the solubility so that the haze during dot preparation tends to increase. Therefore, —O—, —S—, —CO—, —COO—, —OCO—, —COS—, and —SCO— are preferable; and —O—, —CO—, —COO—, and —OCO— are more preferable from the viewpoint of stability of the compound. The alkyl group as R may be linear or branched. The number of carbon atoms thereof is preferably in a range of 1 to 3, and examples thereof include a methyl group, an ethyl group, and an n-propyl group.

$Sp^{11}$, $Sp^{12}$, $Sp^{13}$, $Sp^{14}$ each independently represent a single bond or an alkylene group having 1 to 10 carbon atoms, more preferably a single bond or an alkylene group having 1 to 7 carbon atoms, and still more preferably a single bond or an alkylene group having 1 to 4 carbon atoms. Here, hydrogen atoms of the alkylene group may be substituted with fluorine atoms. The alkylene group may or may not be branched, but a linear alkylene group which is not branched is preferable. From the viewpoint of synthesis, it is preferable that $Sp^{11}$ and $Sp^{14}$ are the same as each other and $Sp^{12}$ and $Sp^{13}$ are the same as each other.

$A^{11}$ and $A^{12}$ represent a monovalent to tetravalent aromatic hydrocarbon group. The number of carbon atoms of the aromatic hydrocarbon group is preferably in a range of 6 to 22, more preferably in a range of 6 to 14, still more preferably in a range of 6 to 10, and particularly preferably 6. The aromatic hydrocarbon group as $A''$ and $A''$ may include a substituent. Examples of such a substituent include an alkyl group having 1 to 8 carbon atoms, an alkoxy group, a halogen atom, a cyano group, and an ester group. As the description of these groups and preferable ranges thereof, the description corresponding to $T^{11}$ can be referred to. Examples of the substituent which may be included in the aromatic hydrocarbon group as $A^{11}$ and $A^{12}$ include a methyl group, an ethyl group, a methoxy group, an ethoxy group, a bromine atom, a chlorine atom, and a cyano group. Since liquid crystals can be aligned with a small addition amount of molecule containing a large amount of perfluoroalkyl moiety therein and this results in a decrease in haze, it is preferable that $A^{11}$ and $A^{12}$ are tetravalent such that the molecule has a large amount of perfluoroalkyl group. From the viewpoint of synthesis, it is preferable that $A^{11}$ and $A^{12}$ are the same as each other.

It is preferable that $T^{11}$ represents a divalent group or a divalent aromatic heterocyclic group (X contained in $T^{11}$ represents an alkyl group having 1 to 8 carbon atoms, an alkoxy group, a halogen atom, a cyano group, or an ester group; Ya, Yb, Yc, and Yd each independently represent a hydrogen atom or an alkyl group having 1 to 4 carbon atoms).

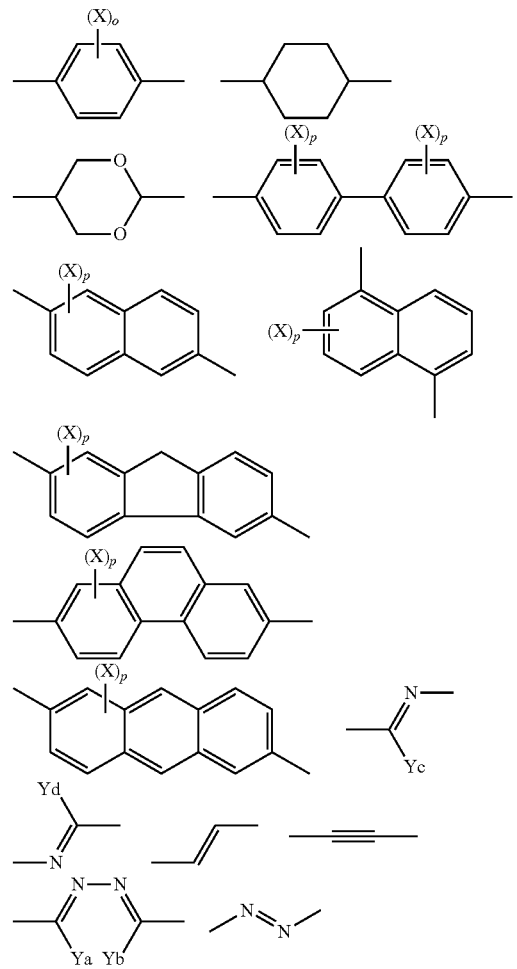

Among these, more preferable groups are shown below.

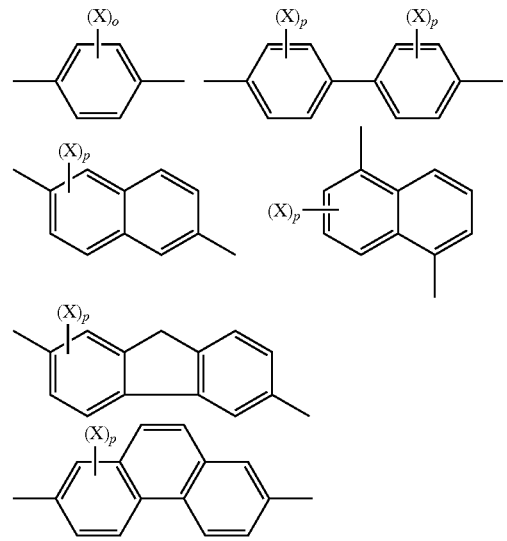

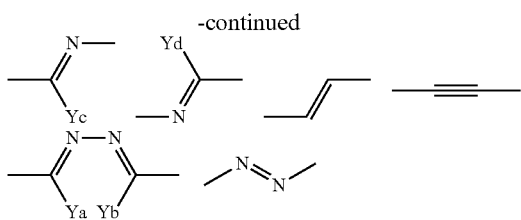

Further, still more preferable groups are shown below.

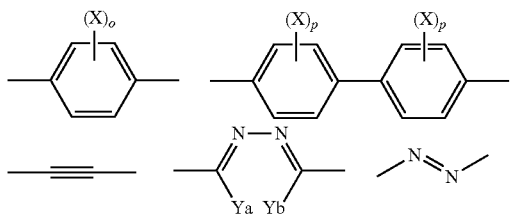

Further, the most preferable group is shown below.

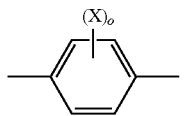

The number of carbon atoms of the alkyl group as X contained in $T^{11}$ is in a range of 1 to 8, preferably in a range of 1 to 5, and more preferably in a range of 1 to 3. The alkyl group may be any of linear, branched, and cyclic, and it is preferable that the alkyl group is linear or branched. Preferred examples of the alkyl group include a methyl group, an ethyl group, an n-propyl group, and an isopropyl group. Among these, a methyl group is preferable.

As the alkyl moiety of the alkoxy group as X contained in the $T^{11}$, description and the preferable range of the alkyl group as X contained in $T^{11}$ can be referred to. Examples of the halogen atom as X contained in $T^{11}$ include a fluorine atom, a chlorine atom, a bromine atom, and an iodine atom. Among these, a chlorine atom or a bromine atom is preferable. Examples of the ester group as X contained in $T^{11}$ include a group represented by $R^a$COO—. As $R^a$, an alkyl group having 1 to 8 carbon atoms can be exemplified. As the description and the preferable range of the alkyl group as le, the description and the preferable range of the alkyl group as X contained in $T^{11}$ can be referred to. Specific examples of the ester include $CH_3COO$— and $C_2H_5COO$—. The alkyl group having 1 to 4 carbon atoms as Ya, Yb, Yc, and Yd may be linear or branched. Examples of such an alkyl group include a methyl group, an ethyl group, an n-propyl group, and an isopropyl group.

It is preferable that the divalent aromatic heterocyclic group includes a 5-, 6-, or 7-membered heterocyclic ring. Among these, a 5- or 6-membered ring is preferable and a 6-membered ring is most preferable. Preferred examples of the heteroatom constituting a heterocyclic ring include a nitrogen atom, an oxygen atom, and a sulfur atom. It is preferable that the heterocyclic ring is an aromatic heterocyclic ring. The aromatic heterocyclic ring is typically an unsaturated heterocyclic ring. An unsaturated heterocyclic ring having the most double bonds is further preferable. Examples of the heterocyclic ring include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thiin ring, a pyridine ring, a piperidine ring, an oxazine ring, a morpholine ring, a thiazine ring, a pyridazine ring, a pyrimidine ring, a pyrazine ring, a piperazine ring, and a triazine ring. A divalent heterocyclic group may include a substituent. As the description and the preferable range of the examples of such a substituent, the description of the substituent as the monovalent to tetravalent aromatic hydrocarbon represented by $A^{11}$ and $A^{12}$ can be referred to.

$Hb^{11}$ represents a perfluoroalkyl group having 2 to 30 carbon atoms, more preferably a perfluoroalkyl group having 3 to 20 carbon atoms, and still more preferably a perfluoroalkyl group having 3 to 10 carbon atoms. The perfluoroalkyl group may be linear, branched, or cyclic. Among these, a linear or branched perfluoroalkyl group is preferable; and a linear perfluoroalkyl group is more preferable.

m11 and n11 each independently represent 0 to 3, and "m11+n11≥1" is satisfied. Here, a plurality of structures in the parentheses may be the same as or different from each other, and it is preferable that the structures are the same as each other. M11 and n11 in Formula (I) are determined by the valences of $A^{11}$ and $A^{12}$, and the preferable ranges are determined by the preferable ranges of the valences of $A^{11}$ and $A^{12}$.

o and p contained in $T^{11}$ each independently represent an integer of 0 or greater. In a case where o and p represent 2 or greater, a plurality of X's may be the same as or different from each other. It is preferable that o contained in $T^{11}$ represents 1 or 2. It is preferable that p contained in $T^{11}$ represents an integer of 1 to 4 and more preferable that p represents 1 or 2.

The molecular structure of the compound represented by Formula (I) may or may not have symmetry. Further, the symmetry here corresponds to at least one of point symmetry, line symmetry, or rotational symmetry, and the asymmetry does not correspond to any of point symmetry, line symmetry, and rotational symmetry.

The compound represented by Formula (I) is a compound obtained by combining the perfluoroalkyl group ($Hb^{11}$) described above, linking groups of -(-$Sp^{11}$-$L^{11}$-$Sp^{12}$-$L^{12}$) m11-$A^{11}$-$L^{13}$- and -$L^{14}$-$A^{12}$-($L^{15}$-$Sp^{13}$-$L^{16}$-$Sp^{14}$-)n11-, and preferably $T^{11}$ which is a divalent group having an excluded volume effect. It is preferable that two perfluoroalkyl groups ($Hb^{11}$) present in a molecule are the same as each other and also preferable that linking groups of -(-$Sp^{11}$-$L^{11}$-$Sp^{12}$-$L^{12}$) m11-$A^{11}$-$L^{13}$—and -$L^{14}$-$A^{12}$-($L^{15}$-$Sp^{13}$-$L^{16}$$Sp^{14}$-)n11- are the same as each other. It is preferable that $Hb^{11}$-$Sp^{11}$-$L^{11}$-$Sp^{12}$—and —$Sp^{13}$-$L^{16}$-$Sp^{14}$-$Hb^{11}$ at the terminal represent a group represented by any of the following formulae.

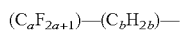

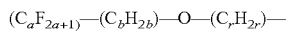

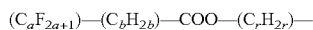

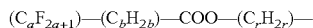

In the formulae above, a represents preferably 2 to 30, more preferably 3 to 20, and still more preferably 3 to 10. b represents preferably 0 to 20, more preferably 0 to 10, and still more preferably 0 to 5. a+b is in a range of 3 to 30. r represents preferably 1 to 10 and more preferably 1 to 4.

Further, it is preferable that $Hb^{11}$-$Sp^{11}$-$L^{11}$-$Sp^{12}$-$L^{12}$— and -$L^{15}$-$Sp^{13}$-$L^{16}$-$Sp^{14}$-$Hb^{11}$ at the terminal of Formula (I) represent a group represented by any of the following formulae.

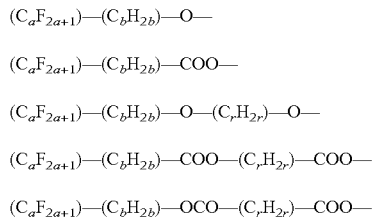

In the formula above, the definitions for a, b, and r are the same as those for a, b, and r described above.

The amount of the surfactant to be added to the liquid crystal composition is preferably in a range of 0.01% by mass to 10% by mass, more preferably in a range of 0.01% by mass to 5% by mass, and particularly preferably in a range of 0.02% by mass to 1% by mass with respect to the total mass of the polymerizable liquid crystal compound.

—Chiral Agent (Optical Active Compound)—

A chiral agent has a function of inducing a helical structure of the cholesteric liquid crystalline phase. Twisted directions or helical pitches of a helix induced are different according to a compound, and thus, a chiral agent may be selected according to the purpose.

The chiral agent is not particularly limited, a known compound (for example, described in Liquid Crystal Device Handbook, Chapter 3, Paragraph 4-3, Chiral Agent for twisted nematic (TN) and super twisted nematic (STN), Page 199, Japan Society for the Promotion of Science edited by 142nd committee, 1989), and derivatives of isosorbide and isomannide can be used.

In general, the chiral agent includes an asymmetric carbon atom, but an axial asymmetric compound or a planar asymmetric compound which does not include an asymmetric carbon atom can also be used as the chiral agent. Examples of the axial asymmetric compound or the planar asymmetric compound include binaphthyl, helicene, paracyclophane, and derivatives thereof. The chiral agent may have a polymerizable group. In a case where both of the chiral agent and the liquid crystal compound have a polymerizable group, a polymer having a repeating unit derived from the polymerizable liquid crystal compound and a repeating unit derived from the chiral agent can be formed by a polymerization reaction between the polymerizable chiral agent and the polymerizable liquid crystal compound. In this embodiment, it is preferable that the polymerizable group of the polymerizable chiral agent is identical to the polymerizable group of the polymerizable liquid crystal compound. Accordingly, it is preferable that the polymerizable group of the chiral agent is also an unsaturated polymerizable group, an epoxy group, or an aziridinyl group, an unsaturated polymerizable group is more preferable, and an ethylenically unsaturated polymerizable group is particularly preferable.

In addition, the chiral agent may be a liquid crystal compound.

It is preferable that the chiral agent contains a photoisomerized group because a pattern having a desired reflection wavelength corresponding to an emission wavelength can be formed by irradiation with actinic rays using a photo mask after coating and alignment. Preferred examples of the photoisomerized group include an isomerized site of a compound exhibiting photochromic properties, an azo group, an azoxy group, and a cinnamoyl group. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

Specific examples of the chiral agent include a compound represented by Formula (12).

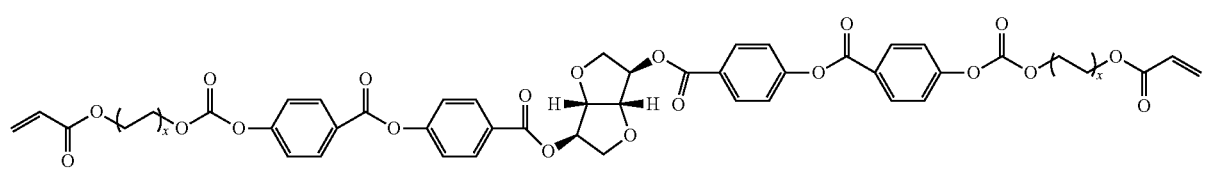

(12)

In the formula, X represents an integer of 2 to 5.

The content of the chiral agent in the liquid crystal composition is preferably in a range of 0.01% by mole to 200% by mole and more preferably in a range of 1% by mole to 30% by mole with respect to the amount of polymerizable liquid crystal compound.

—Polymerization Initiator—

In a case where the liquid crystal composition contains a polymerizable compound, it is preferable that the liquid crystal composition contains a polymerization initiator. In an embodiment where a polymerization reaction progresses by ultraviolet ray irradiation, it is preferable that a polymerization initiator to be used is a photopolymerization initiator which can initiate a polymerization reaction by ultraviolet ray irradiation. Examples of the photopolymerization initiator include an α-carbonyl compound (described in each of the specifications of U.S. Pat. Nos. ,236,7661A and ,236,7670A), acyloin ether (described in the specification of U.S. Pat. No. 2,448,828A), an α-hydrocarbon-substituted aromatic acyloin compound (described in the specification of U.S. Pat. No. 2,722,512A), a polynuclear quinone compound (described in each of the specifications of U.S. Pat. Nos. 3,046,127A and 2,951,758A), a combination of a triaryl imidazole dimer and p-aminophenyl ketone (described in the specification of U.S. Pat. No. 3,549,367A), an acridine compound and phenazine compound (described in JP1985-105667A (JP-S60-105667A) and the specification of U.S. Pat. No. 4,239,850A), an oxadiazole compound (described in the specification of U.S. Pat. No. 4,212,970A), and the like.

The content of the photopolymerization initiator in the liquid crystal composition is preferably in a range of 0.1 to 20% by mass and more preferably in a range of 0.5% by mass to 12% by mass with respect to the content of the polymerizable liquid crystal compound.

—Cross-linking Agent—

The liquid crystal composition may arbitrarily contain a cross-linking agent in order to improve the film strength and durability after curing. A cross-linking agent which is cured by an ultraviolet ray, heat, humidity, and the like can be suitably used as the cross-linking agent.

The cross-linking agent is not particularly limited, but can be suitably selected according to the purpose, and examples of the cross-linking agent include a polyfunctional acrylate compound such as trimethylol propane tri(meth)acrylate and pentaerythritol tri(meth)acrylate; an epoxy compound such as glycidyl (meth)acrylate and ethylene glycol diglycidyl ether; an aziridine compound such as 2,2-bishydroxy methyl butanol-tris[3-(1-aziridinyl) propionate] and 4,4-bis(ethylene iminocarbonyl amino) diphenyl methane; an isocyanate compound such as hexamethylene diisocyanate and biuret type isocyanate; a polyoxazoline compound having an oxazoline group in a side chain; an alkoxy silane compound such as vinyl trimethoxy silane and N-(2-aminoethyl)-3-aminopropyl trimethoxy silane, and the like. In addition, a known catalyst can be used according to reactivity of the cross-linking agent, and improvement of productivity can be attained in addition to improvement of film strength and durability improvement. One type of the cross-linking agent may be independently used, or two or more types thereof may be used in combination.

The content of the cross-linking agent is preferably in a range of 3% by mass to 20% by mass and more preferably in a range of 5% by mass to 15% by mass with respect to 100% by mass of the liquid crystal composition. In a case where the content of the cross-linking agent is set to 3% by mass or greater, the density of the cross-linking is improved. In a case where the content thereof is set to 20% by mass or less, alignment properties or chiral properties of the cholesteric liquid crystal layer can be stabilized.

—Other Additives—

In a case where an inkjet method described below is used as a dot formation method, a monofunctional polymerizable monomer may be used in order to obtain ink physical properties which are typically required. Examples of the monofunctional polymerizable monomer include 2-methoxyethyl acrylate, isobutyl acrylate, isooctyl acrylate, isodecyl acrylate, and octyl-decyl acrylate. In addition, a polymerization inhibitor, an antioxidant, an ultraviolet absorbent, a light stabilizer, a coloring material, metal oxide fine particles, and the like can be further added to the liquid crystal composition, as necessary, in a range where optical performance does not decrease.

It is preferable that the liquid crystal composition is used as a liquid during dot formation. The liquid crystal composition may contain a solvent. The solvent is not particularly limited, but can be suitably selected according to the purpose, and an organic solvent is preferably used.

The organic solvent is not particularly limited, but can be suitably selected according to the purpose, and examples of the organic solvent include ketones such as methyl ethyl ketone and methyl isobutyl ketone, alkyl halides, amides, sulfoxides, a heterocyclic compound, hydrocarbons, esters, ethers, and the like. One type of the organic solvent may be independently used, or two or more types thereof may be used in combination. Among them, the ketones are particularly preferable in consideration of a load on the environment. The above-described component such as the monofunctional polymerizable monomer or the like may function as a solvent.

The liquid crystal composition is applied onto the substrate and then cured to form dots. It is preferable that the liquid crystal composition is applied onto the substrate by jetting the composition. In a case where a plurality (typically, multiple) of dots are applied onto the substrate, printing may be performed using the liquid crystal composition as ink. The printing method is not particularly limited, and various methods such as an inkjet method, a gravure printing method, and a flexographic printing method can be used. Among these, an inkjet method is particularly preferable. A pattern of dots can be formed by applying a known printing technique.

The liquid crystal composition after being applied onto the substrate is dried or heated as necessary and then cured. The polymerizable liquid crystal compound in the liquid crystal composition may be aligned during this drying or heating step. In a case where the liquid crystal composition is heated, the heating temperature is preferably 200° C. or lower and more preferably 130° C. or lower.

The aligned liquid crystal compound may be further polymerized. The polymerization may be either thermal polymerization or photopolymerization through light irradiation, and the photopolymerization is preferable. It is preferable that the light irradiation is performed by using an ultraviolet ray. Irradiation energy is preferably in a range of 20 mJ/cm$^2$ to 50 J/cm$^2$ and more preferably in a range of 100 mJ/cm$^2$ to 1500 mJ/cm$^2$. In order to accelerate a photopolymerization reaction, light irradiation may be performed under heating conditions or under a nitrogen atmosphere. It is preferable that an irradiation wavelength of the ultraviolet ray is 250 nm to 430 nm. It is preferable that polymerization reactivity is high from the viewpoint of stability, and the polymerization reactivity is preferably 70% or greater and more preferably 80% or greater. The polymerization reactivity can be determined by measuring a consumption ratio of a polymerizable functional group using an infrared (IR) absorption spectrum.

(Overcoat Layer)

It is preferable that the optical member includes an overcoat layer. The overcoat layer may be provided on a surface side of the substrate where dots are formed, and it is preferable that the surface of the optical member is flattened.

It is preferable that the overcoat layer is a resin layer having a refractive index of 1.4 to 1.8. The refractive index of a dot formed of a liquid crystal material is approximately 1.6, and an angle (polar angle) from the normal line of light practically incident on a dot can be reduced using an overcoat layer having a refractive index close to 1.6. For example, in a case where light is allowed to be incident on the optical member at a polar angle of 45° using an overcoat layer having a refractive index of 1.6, the polar angle of light to be practically incident on a dot can be set to approximately 27°. Accordingly, the polar angle of light exhibiting retroreflectivity can be widened by the optical member using an overcoat layer, and excellent retroreflectivity can be obtained in a wider range even in a dot at which the angle between the substrate and the surface of the dot on a side opposite to the substrate is small. Further, the overcoat layer may function as an antireflection layer, a pressure sensitive adhesive layer, an adhesive layer, and a hard coat layer.

As an example of the overcoat layer, a resin layer obtained by coating the surface side of the substrate where dots are formed with a composition containing a monomer and curing the coating film may be exemplified. The resin may be selected by considering the adhesiveness or the like of the resin to the substrate or the liquid crystal material forming dots. Examples of such a resin include a thermoplastic resin, a thermosetting resin, and an ultraviolet curable resin. From the viewpoints of durability and solvent resistance, a resin that is cured by cross-linking is preferable and an ultraviolet curable resin that can be cured in a short time is particularly preferable. Examples of the monomer used for forming an overcoat layer include ethyl (meth)acrylate, ethylhexyl (meth)acrylate, styrene, methyl styrene, N-vinylpyrrolidone, polymethylolpropane tri(meth)acrylate, hexanediol (meth) acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

The thickness of the overcoat layer may be determined by considering the maximum height of a dot, and is preferably in a range of 5 μm to 100 μm, more preferably in a range of 10 μm to 50 μm, and still more preferably in a range of 20 μm to 40 μm. The thickness of the overcoat layer is a distance from the substrate surface where dots are not present to the overcoat layer surface.

(Ground Layer)

As an example of other layers, a ground layer provided between the substrate and dots is exemplified. The ground layer is provided for the purpose of adjusting the surface shape during dot formation, ensuring the adhesiveness of dots to the substrate, and adjusting the alignment of the polymerizable liquid crystal composition during dot formation. It is preferable that the ground layer is a resin layer. It is also preferable that the ground layer is a thermosetting resin or a photocurable resin obtained by curing the composition containing a polymerizable compound that is directly applied to the surface of the substrate. Examples of the polymerizable compound include a non-liquid crystalline compound such as a (meth)acrylate monomer and a urethane monomer. Further, it is preferable that the ground layer has a low reflectivity of light at a wavelength where dots reflect light and also preferable that the ground layer does not contain a material reflecting light at a wavelength where dots reflect light. Further, it is preferable that the ground layer is transparent. The refractive index of the ground layer is preferably in a range of 1.2 to 2.0 and more preferably in a range of 1.4 to 1.8. The thickness of the ground layer is not particularly limited, but is preferably in a range of 0.01 to 50 μm and more preferably in a range of 0.05 to 20 μm.

Further, it is preferable that an alignment layer is used as the ground layer. The alignment layer can be disposed by means such as a rubbing treatment of an organic compound such as a polymer (a resin such as polyimide, polyvinyl alcohol, polyester, polyarylate, polyamide imide, polyether imide, polyamide, and modified polyamide), oblique vapor deposition of an inorganic compound, formation of a layer having a microgroove, or the accumulation of an organic compound (for example, an ω-tricosanoic acid, dioctadecyl methyl ammonium chloride, and methyl stearate) using a LANGMUIR-BLODGETT method (an LB film). Further, an alignment film may be used in which an alignment function occurs by application of an electric field, application of a magnetic field, or light irradiation.

In particular, it is preferable that an alignment film formed of a polymer is subjected to a rubbing treatment, and then, a liquid crystal composition is applied onto a rubbing treatment surface. The rubbing treatment can be performed by rubbing the surface of the polymer layer with paper and cloth in a constant direction a plurality of times.

The liquid crystal composition may be applied onto a front surface of the support or a front surface of the support which is subjected to the rubbing treatment without disposing the alignment film.

The member for displaying a projected image may include an alignment layer as the underlayer to be coated with the liquid crystal composition during the formation of cholesteric liquid crystal dots.

In a case where the liquid crystal layer is formed by using a temporary support, the alignment film may not become a layer configuring the optical member by being peeled off along with the temporary support.

The thickness of the alignment layer is preferably in a range of 0.01 to 5 μm and more preferably in a range of 0.05 to 2 μm.

(Other Layers)

The optical member may include other layers other than the cholesteric liquid crystal dots. It is preferable that other layers are all transparent in a visible light range. The expression "transparent in a visible light range" in the present specification means that the transmittance of visible light is 70% or greater. Examples of other layers include an adhesive layer, a pressure sensitive adhesive layer, an antireflection layer, and an interlayer described below.

—Adhesive Layer—

The optical member may include an adhesive layer for adhesion between respective layers. The adhesive layer may be provided, for example, between the cholesteric liquid crystal dot and the substrate, between the cholesteric liquid crystal dot and the base material, and between the cholesteric liquid crystal dot and the interlayer.

The adhesive layer may be formed of an adhesive. Examples of the adhesive include a hot melt type adhesive, a thermal curing type adhesive, a photocuring type adhesive, a reaction curing type adhesive, and a pressure sensitive adhesion type adhesive in which curing is not necessary, and a compound such as an acrylate-based compound, a urethane-based compound, a urethane acrylate-based compound, an epoxy-based compound, an epoxy acrylate-based compound, a polyolefin-based compound, a modified olefin-based compound, a polypropylene-based compound, an ethylene vinyl alcohol-based compound, a vinyl chloride-based compound, a chloroprene rubber-based compound, a cyanoacrylate-based compound, a polyamide-based compound, a polyimide-based compound, a polystyrene-based compound, and a polyvinyl butyral-based compound can be used as a material of each adhesive. From the viewpoint of workability and productivity, the photocuring type adhesive is preferable as a curing method, and from the viewpoint of optical transparency and heat resistance, the acrylate-based compound, the urethane acrylate-based compound, the epoxy acrylate-based compound, and the like are preferably used as the material.

A film thickness of the adhesive layer may be in a range of 0.5 to 10 μm and is preferably in a range of 1 to 5 μm. In order to reduce color unevenness or the like of the optical member, it is preferable that the film thickness is uniform.

—Pressure Sensitive Adhesive Layer—

The optical member may include a pressure sensitive adhesive layer for adhesion between respective layers. It is preferable that the pressure sensitive adhesive layer is provided on the rear surface of the substrate of the optical member, that is, the surface of the substrate on a side opposite to the dots. In a case where a plurality of layers including cholesteric liquid crystal dots are laminated, a plurality of members provided with cholesteric liquid crystal dots or an overcoat layer, as necessary, are prepared on the substrate and each member can be laminated through the pressure sensitive adhesive layer.

—Antireflection Layer—

The visibility is degraded in some cases due to the interface reflection on the surface of base material on the opposite side of the surface of the substrate provided with the cholesteric liquid crystal dots or an air surface of another layer provided on the surface of the base material. In order to prevent such a phenomenon, the antireflection layer may be provided.

Examples of the antireflection layer include the following configurations.

Transparent support/hard coat layer/low-refractive index layer

Transparent support/hard coat layer/high-refractive index layer/low-refractive index layer Transparent support/hard coat layer/medium-refractive index layer/high-refractive index layer/low-refractive index layer In addition, each layer may have different functions, and examples thereof include a low-refractive index layer having antifouling properties and a high-refractive index layer having antistatic properties (for example, described in JP1998-206603A (JP-H10-206603A) and JP2002-243906A). Other examples thereof include an antireflection layer having a so-called moth-eye structure or a structure similar to the moth-eye structure (for example, described in JP2004-155083A and JP2015-74087A). The antireflection layer may be bonded by the adhesive layer and the substrate provided with the cholesteric liquid crystal dots or may be formed directly on the substrate provided with the cholesteric liquid crystal dots.

(Multiple Image Due to Multilayer Configurations)

In general, in the member for displaying a projected image, an image of reflection light from a layer reflecting projection light and an image of reflection light from an air interface of the first base material or the second base material as seen from a projection light incidence side of the member for displaying a projected image are superimposed, and thus, a problem of a double image (or a multiple image) occurs. In order to improve the situation, the antireflection layer may be disposed on each base material. Further, a phase difference film such as a λ/4 plate may be applied and light after passing through the optical member may be P-polymerized to reduce the reflectivity. Further, these methods may be used in combination.

<Combiner>

The member for displaying a projected image of the present invention can be used as a combiner of a head-up display system. In the head-up display system, the combiner indicates an optical member which can display an image projected from a projector to be visible, and can simultaneously observe information or scenery on a surface on an opposite side when the combiner is observed from a surface on the same side on which the image is displayed. That is, the combiner has a function as an optical path combiner which superimposes external light and video light to be displayed. From a different viewpoint, the combiner has a function of combining an image formed of reflection light and an image formed of transmission light to be displayed.

<Windshield Glass>

The member for displaying a projected image of the present invention may be windshield glass. It is preferable that the optical member is disposed between the first base material and the second base material, both of the first base material and the second base material are glass, and the substrate of the optical member is formed of a resin film. For example, at least a part of the windshield glass may have a configuration in which a projected image can be displayed. At least a part of the windshield glass may have a function as the combiner described above. In the present specification, the windshield glass indicates window glass of a general conveyance such as a vehicle, for example, a car, an electric train, and the like, an airplane, a ship, and play equipment. It is preferable that the windshield glass is front glass of a conveyance in a travelling direction. It is preferable that the windshield glass is front glass of a conveyance.

The windshield glass may be in the shape of a flat surface. The windshield glass may be formed to be embedded in a conveyance to be applied, and for example, may have a curved surface. In the windshield glass formed to be embedded in a conveyance to be applied, in general, a direction which becomes an upper side (a vertical upper side) or a surface which becomes the observer side at the time of being used can be specified. In the present specification, in the windshield glass, a glass plate in a position far from the observer side is referred to as a first glass plate (first base material) and a glass plate in a position closer to the observer side is referred to as a second glass plate (second base material) in some cases.

(Laminated Glass)

It is preferable that the windshield glass has a configuration of laminated glass. That is, it is preferable that the windshield glass has a structure in which two glass plates adhere to each other through an interlayer (also referred to as an intermediate film). A glass plate which is usually used in the windshield glass can be used as the glass plate. The thickness of the glass plate is not particularly limited, but may be approximately 0.5 mm to 5 mm, and is preferably in a range of 1 mm to 3 mm and more preferably in a range of 2.0 to 2.3 mm.

The windshield glass can be manufactured by using a known preparation method of laminated glass. In general, the windshield glass can be manufactured by a method in which an intermediate film sheet for laminated glass described below is interposed between two glass plates, and then, a heating treatment and a pressurizing treatment (a treatment using a rubber roller, or the like) are repeated several times, and finally, a heating treatment is performed under pressurizing conditions by using an autoclave or the like.

It is preferable that the optical member of the present invention is provided as a portion of the interlayer of the windshield glass.

The cholesteric liquid crystal dots may be formed on the substrate and then adhere to the first base material or the second base material or may be formed directly on the first base material or the second base material. In this case, the uneven shape of the cholesteric liquid crystal dots is disposed so as to face the viewing side.

The windshield glass having the configuration of laminated glass may be formed by performing a step of preparing typical laminated glass after a base material having cholesteric liquid crystal dots are disposed on the surface of the glass plate or the base material having the cholesteric liquid crystal dots may be formed by performing the heating treatment and the pressurizing treatment described above using a laminated intermediate film sheet for laminated glass described below as an intermediate film sheet (Intermediate Film Sheet)

In a case of using an intermediate film sheet that does not include the base material having the cholesteric liquid crystal dots, any known intermediate film sheet may be used. For example, it is possible to use a resin film containing a resin selected from the group consisting of polyvinyl butyral (PVB), an ethylene-vinyl acetate copolymer, and a nitrogen-containing resin. It is preferable that the resin described above is a main component of the intermediate film sheet. Furthermore, the main component indicates a component accounts for a proportion of greater than or equal to 50% by mass of the intermediate film sheet.

In the resins described above, the polyvinyl butyral or the ethylene-vinyl acetate copolymer is preferable, and the polyvinyl butyral is more preferable. It is preferable that the resin is a synthetic resin.

The polyvinyl butyral can be obtained by acetalizing polyvinyl alcohol by butyl aldehyde. In a degree of acetalization of the polyvinyl butyral described above, a preferred lower limit is 40% and a preferred upper limit is 85%, and a more preferred lower limit is 60% and a more preferred upper limit is 75%.

In general, in the polyvinyl alcohol, polyvinyl alcohol which is obtained by saponifying polyvinyl acetate and has a degree of saponification of 80 to 99.8% by mole is generally used.

In addition, in a degree of polymerization of the polyvinyl alcohol described above, the lower limit thereof is preferably 200 and the upper limit thereof is preferably 3000. In a case where the degree of polymerization of the polyvinyl alcohol is set to 200 or greater, penetration resistance of laminated glass to be obtained is excellent. Further, in a case where the degree of polymerization of the polyvinyl alcohol is set to 3000 or less, formability of a resin film is excellent, stiffness of the resin film does not excessively increase, and workability is excellent. The lower limit is more preferably 500 and the upper limit is more preferably 2000.

(Laminated Intermediate Film Sheet for Laminated Glass)

The laminated intermediate film sheet for laminated glass includes functional layers such as a reflection layer and a phase difference layer on the support and can be formed by bonding the base material (functional layer) having the cholesteric liquid crystal dots to the surface of the intermediate film sheet (support). Alternatively, the laminated intermediate film sheet for laminated glass can be formed by interposing the functional layer between two intermediate film sheets described above. Two intermediate film sheets may be the same as or different from each other, but it is preferable that the two intermediate film sheets are the same as each other.

In order to bond the functional layer onto the intermediate film sheet, a known bonding method can be used, and it is preferable to use a lamination treatment. In a case where the lamination treatment is performed such that a laminate and the intermediate film sheet are not peeled off after being processed, it is preferable that the lamination treatment is performed under a certain degree of heating and pressurizing conditions.

In order to stably perform lamination, a film surface temperature of the intermediate film sheet on an adhesion side is preferably in a range of 50° C. to 130° C. and more preferably in a range of 70° C. to 100° C.

It is preferable that pressurization is performed at the time of performing the lamination. The pressurization is performed at a pressure of preferably less than 2.0 kg/cm$^2$, more preferably in a range of 0.5 to 1.8 kg/cm$^2$, and still more preferably in a range of 0.5 to 1.5 kg/cm$^2$.

In addition, the base material having the cholesteric liquid crystal dots may be peeled off simultaneously with, immediately after, or immediately before the lamination. That is, the laminated intermediate film sheet obtained after the lamination may not include the base material.

(Position of Portion Having Combiner Function)

In the windshield glass, a portion having a combiner function, that is, the base material having the cholesteric liquid crystal dots of the present invention may be provided in any position, and it is preferable that the base material is provided in a position which can be easily and visually recognized by an observer (for example, a driver) at the time of being used as a head-up display system. For example, a position where the portion having a combiner function is provided may be determined based on a relationship between a position of a driver seat of a conveyance to be applied and a position on which a projector is disposed.

<Projection System>

The projection system of the present invention includes the member for displaying a projected image of the present invention. It is preferable that the projection system further includes means for emitting projection light.

The member for displaying a projected image is used by being combined with a projector or the like which has a function of emitting projection light and can be used for displaying a projected image. In the present specification, a projected image does not indicate the surrounding scenery, but indicates a video based on light projection from a projector to be used. The projected image may be a video having a single color, or may be a video having a multicolor or a full color. The projected image may be formed by reflection light of the member for displaying a projected image. In a case where the member for displaying a projected image includes the portion having a combiner function, the projected image may be observed as a virtual image which is viewed as floating on the portion having a combiner function of the member for displaying a projected image as seen from the observer.

The incident rays may be incident from any direction such as up-and-down and right-and-left directions of the member for displaying a projected image, and the direction may be determined according to the direction of the observer. For example, the incident rays may be incident at a tilt incidence angle from a lower direction at the time of being used as described above.

In the member for displaying a projected image, there is a case where a direction which becomes an upper side (a vertical upper side) or a surface which becomes the observer side at the time of being used can be specified during the manufacture. For example, in the windshield glass formed for a conveyance to be applied, a direction which becomes an upper side (a vertical upper side) or a surface which becomes the observer side at the time of being used can be specified.

Figure 8:
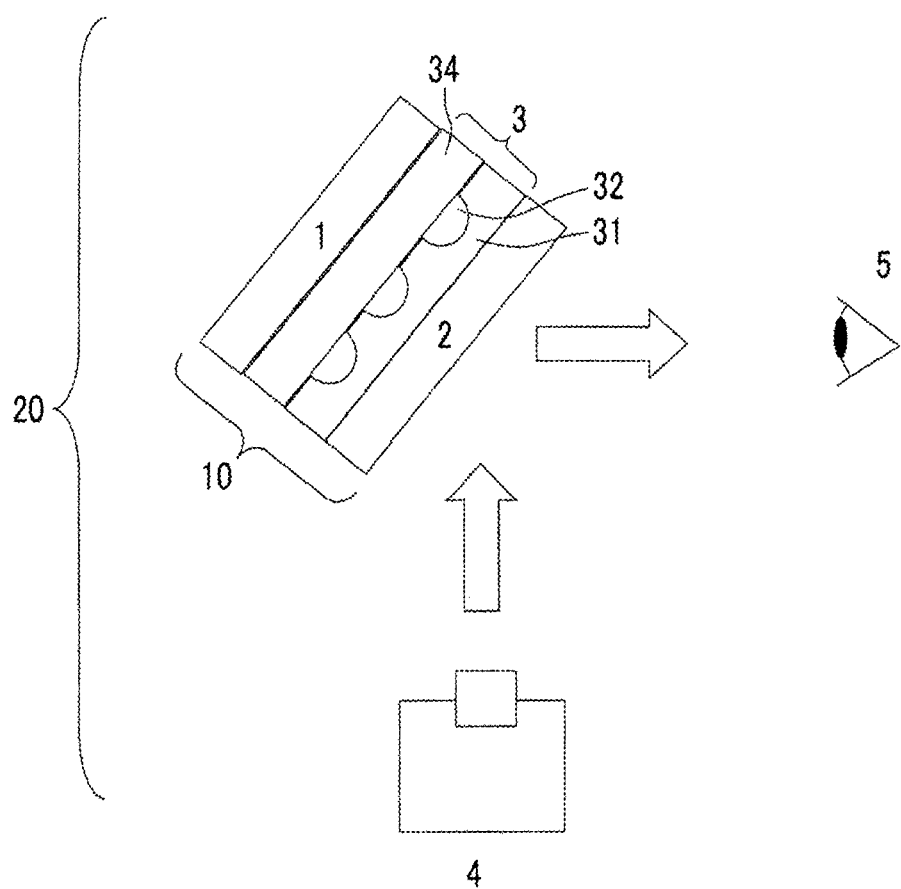
FIG. 8 is a configuration view schematically illustrating a projection system according to an embodiment of the present invention.

Next, an embodiment of the projection system obtained by using the member for displaying a projected image of the present invention will be described with reference to FIG. 8. FIG. 8 is a configuration view schematically illustrating the projection system obtained by using the member for displaying a projected image of the present invention.

As illustrated in FIG. 8, a projection system 20 includes a projector 4 which emits projection light in accordance with a projected image; and a member 10 for displaying a projected image which is disposed by being inclined to a position at an angle of 45° from the horizontal direction. The member 10 for displaying a projected image includes a first base material 1; a second base material 2; and an optical member 3 provided between the first base material 1 and the second base material 2. The optical member 3 includes a substrate 34; a cholesteric liquid crystal dot 32; and an overcoat layer 31. The cholesteric liquid crystal dot 32 is formed on a side where light from the projector 4 is incident.

The projection system of the present invention is a system in which projection light emitted from the projector 4 is incident on the member 10 for displaying a projected image, and the projection light is reflected by the cholesteric liquid crystal dot to display a projected image. According to this projection system, since the reflectivity of oblique projection light is high, an observer positioned in a position at 45° with respect to the member for displaying a projected image can observe the projected image having a low haze.

In the present embodiment, the arrangement angle of the member 10 for displaying a projected image is set as 45°, but may be in a range of 30° to 60° with respect to the member for displaying a projected image. Even at such a wide viewing angle, it is possible to observe a projected image having a low haze.

—Head-up Display System—

Preferred other examples of the projection system may include a head-up display system. The head-up display system using the windshield glass as the member for displaying a projected image can be referred to JP1990-141720A (JP-H02-141720A), JP1998-96874A (JP-H10-96874A), JP2003-98470A, U.S. Pat. No. 5,013,134A, JP2006-512622A, and the like.

—Projector—

In the present specification, the "projector" is a "device projecting light or an image", and includes a "device projecting a drawn image". In the head-up display system, it is preferable that the projector includes a drawing device, and reflects and displays an image (a real image) drawn on a small intermediate image screen by using a combiner.

The drawing device of the projector is not particularly limited insofar as the drawing device has a function of projecting an image. Examples of the projector include a liquid crystal projector, a digital light processing (DLP) projector using a digital micromirror device (DMD), a grating light valve (GLV) projector, a liquid crystal on silicon (LCOS) projector, a CRT projector, and the like. The DLP projector and the grating light valve (GLV) projector may use microelectromechanical systems (MEMS).

A laser light source, a light emitting diode (LED), a discharge tube, and the like can be used as a light source of the projector. The projector may include reflecting mirror or the like which adjusts an optical path projection light formed in the drawing device.

In particular, the member for displaying a projected image of the present invention is useful in the head-up display system which is used in combination with the projector using laser of which a light emission wavelength is not continuous in a visible light range, an LED, an organic light emitting diode (OLED), and the like in a light source. The center wavelength of the selective reflection of the cholesteric liquid crystal layer can be adjusted according to each light emission wavelength. In addition, a liquid crystal display device (LCD), an OLED, and the like can be used for projecting a display of which display light is polarized.

EXAMPLES

Hereinafter, the present invention will be described in more detail with reference to examples. Materials, reagents, substance quantities and ratios thereof, operations, and the like described in the following examples can be suitably changed insofar as the change is departed from the gist of the present invention. Accordingly, the range of the present invention is not limited to the following examples.

Example 1

(Preparation of Protective Film 01)

A cellulose acetate film having a film thickness of 60 μm was prepared by referring to examples ([0267] to [0270]) of JP2012-18396A. This film was set to a protective film 01.

(Preparation of Ground Layer)

The following composition was stirred and dissolved in a container whose temperature was maintained at 25° C., thereby preparing a ground layer solution.

—Ground Layer Solution—

| | |
|---|---|
| Propylene glycol monomethyl ether acetate | 67.8 parts by mass |
| Dipentaerythritol hexaacrylate | 5.0 parts by mass (manufactured by Nippon Kayaku Co., Ltd., trade name: KAYARAD (registered trademark) DPHA) |
| MEGAFAC (registered trademark) RS-90 (manufactured by DIC CORPORATION) | 26.7 parts by mass |
| IRGACURE (registered trademark) 819 (manufactured by BASF SE) | 0.5 parts by mass |

The prepared protective film 01 was coated with the ground layer solution prepared in the above-described manner with a coating amount of 3 mL/m$^2$ using a bar coater, the film surface was heated to a temperature of 90° C., dried for 120 seconds, and irradiated with ultraviolet rays at an intensity of 700 mJ/cm$^2$ using an ultraviolet irradiation device under nitrogen purge at an oxygen concentration of 100 ppm or less, and then the cross-linking reaction was promoted, thereby preparing a ground layer.

(Formation of Cholesteric Liquid Crystal Dots)

The following composition was stirred and dissolved in a container whose temperature was maintained at 25° C., thereby preparing a cholesteric liquid crystal ink liquid (liquid crystal composition) 1.

—Cholesteric Liquid Crystal Ink Liquid 1—

| | |
|---|---|
| Methoxy ethyl acrylate | 145.0 parts by mass |
| Following mixture of rod-like liquid crystal compounds | 100.0 parts by mass |
| IRGACURE (registered trademark) 819 (manufactured by BASF SE) | 10.0 parts by mass |
| Chiral agent having the following structure | 5.8 parts by mass |
| Surfactant having the following structure | 0.08 parts by mass |

The structures of the rod-like liquid crystal compounds will be shown below. The numerical values indicate the amount (% by mass) of the mixture of the rod-like liquid crystal compounds with respect to the total amount of the mixture in the cholesteric liquid crystal ink liquid (liquid crystal composition) 1. Further, a group represented by R is a partial structure shown in the lower right portion and is bonded to a site of an oxygen atom of this partial structure.

Rod-like liquid crystal compound

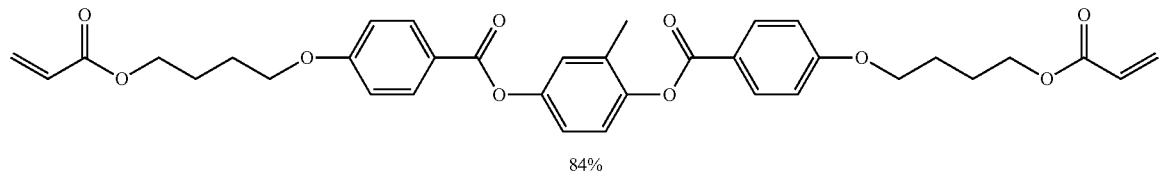

84%

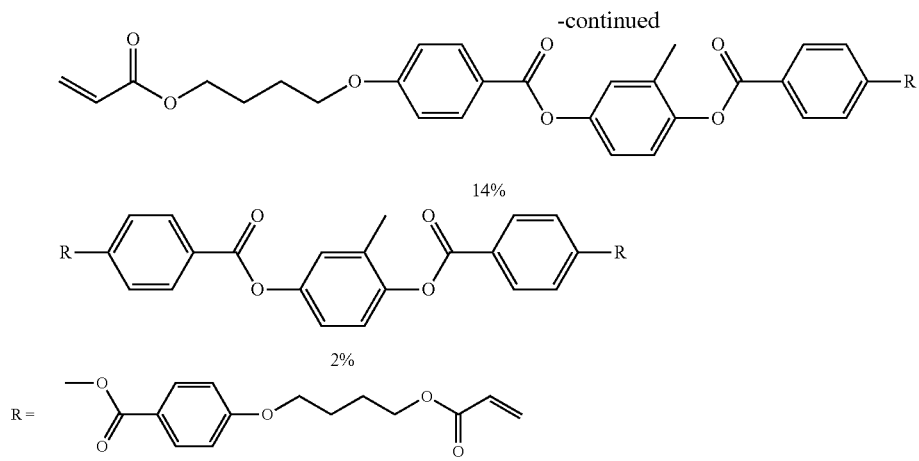

14%

2%

Further, the structures of the chiral agent and the surfactant are shown below.

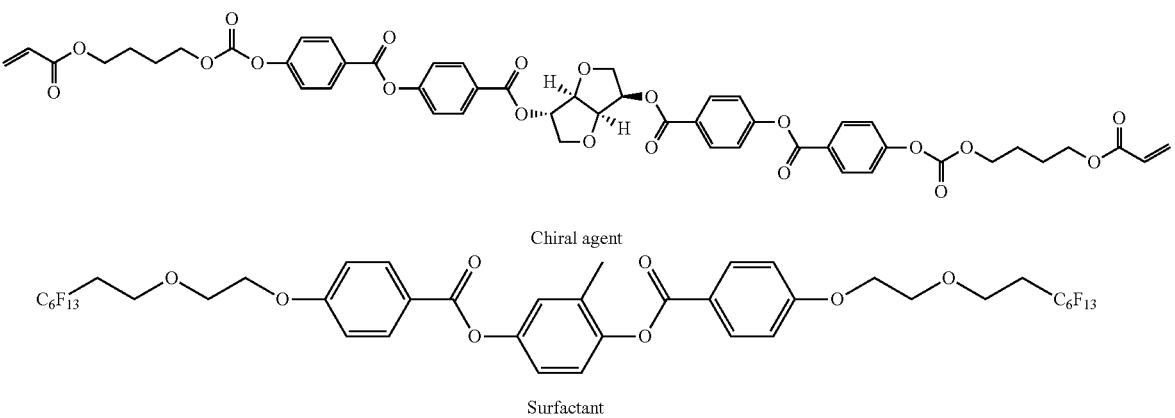

Chiral agent

Surfactant

The cholesteric liquid crystal ink liquid 1 prepared in the above-described manner was jetted onto the ground layer on the prepared protective film 01 by adjusting the liquid amount such that the diameter of a dot was set to 30 μm using an inkjet printer (DMP-2831, manufactured by FUJI-FILM Dimatix Inc.), the layer was dried at 95° C. for 30 seconds and irradiated with ultraviolet rays at an intensity of 500 mJ/cm² using an ultraviolet irradiation device, and a plurality of dots were formed. At this time, the distance between the centers of dots was 60 μm and dots were uniformly arranged as grid points. This was set as an optical member 01.

(Formation of Overcoat Layer)

The following composition was stirred and dissolved in a container whose temperature was maintained at 25° C., thereby preparing a coating solution for an overcoat.

—Coating Solution for Overcoat—

| | |
|---|---|
| Acetone | 100.0 parts by mass |
| KAYARAD DPCA-30 (manufactured by Nippon Kayaku Co., Ltd.) | 100.0 parts by mass |
| IRGACURE 819 (registered trademark) (manufactured by BASF SE) | 3.0 parts by mass |

The optical member 01 was coated with the prepared coating solution for an overcoat using a bar coater. Thereafter, the film surface was heated to a temperature of 50° C., dried for 60 seconds, and irradiated with ultraviolet rays at an intensity of 500 mJ/cm² using an ultraviolet irradiation device, and then the cross-linking reaction was promoted, thereby preparing an optical member 01 formed by applying an overcoat layer having a thickness of 10 μm from the upper end of the ground layer. The thickness of the overcoat layer was measured based on the cross-sectional SEM image. This was set as a cholesteric liquid crystal dot film 01.

(Preparation of Cholesteric Liquid Crystal Dot Film 02)

A cholesteric liquid crystal ink liquid (liquid crystal composition) 2 was prepared in the same manner as that for the cholesteric liquid crystal ink liquid (liquid crystal composition) 1 except that the amount of the chiral agent to be added was changed into 5.1 parts by mass, dots were formed using an inkjet printer, an overcoat layer was formed, thereby preparing a cholesteric liquid crystal dot film 02.

(Preparation of Cholesteric Liquid Crystal Dot Film 03)

A cholesteric liquid crystal ink liquid (liquid crystal composition) 3 was prepared in the same manner as that for the cholesteric liquid crystal ink liquid (liquid crystal composition) 1 except that the amount of the chiral agent to be added was changed into 6.5 parts by mass, dots were formed using an inkjet printer, an overcoat layer was formed, thereby preparing a cholesteric liquid crystal dot film 03.

The cholesteric liquid crystal dot films 01, 02, and 03 prepared in the above-described manner was laminated using a pressure sensitive adhesive (manufactured by Soken Chemical & Engineering Co., Ltd.), and these laminated cholesteric liquid crystal dot films were disposed between two sheets of glass by adhering a pressure sensitive adhesive thereto.

Comparative Example 1

Laminated half mirrors were disposed between two sheets of glass in the same manner as in Example 1 except that half mirrors were used in place of laminated cholesteric liquid crystal dot films. As a half mirror, a product (manufactured by KODAMA GLASS, product number: MJM-40) was used.

Comparative Example 2

Laminated Dilad Screens (manufactured by KIMOTO CO., LTD.) were disposed between two sheets of glass in the same manner as in Example 1 except that Dilad Screens were used in place of laminated cholesteric liquid crystal dot films.

Comparative Example 3

Laminated polyvinyl butyral films were disposed between two sheets of glass in the same manner as in Example 1 except that polyvinyl butyral films were used in place of laminated cholesteric liquid crystal dot films. The polyvinyl butyral films were prepared by referring to examples of WO2014156419A1.

(Evaluation)

Projector light displaying white was projected on the member for displaying a projected image inclined at 45° C. with respect to the incident rays, and the luminance was measured. A color luminance meter BM-5 (manufactured by TOPCON CORPORATION) was used for the measurement.

Two places were set for disposing the luminance meter, which were a site where projector light was specular-reflected with the member for displaying a projected image as the reflection surface and a site at which the angle with respect to reflection light was 45° and which was present in the same plane of the specular reflection light.

As the projector, EH-TW410 (manufactured by Seiko Epson Corp.) was used.

Further, the haze of the member for displaying a projected image was measured. NDH-2000 (manufactured by NIPPON DENSHOKU INDUSTRIES Co., LTD.) was used for the measurement.

The results are listed in Table 1. The normalized luminance values indicate relative values in a case where the value of specular reflection light of Example 1 was set to 100.

TABLE 1

| | | Example 1 | Comparative Example 1 | Comparative Example 2 | Comparative Example 3 |
|---|---|---|---|---|---|
| Layer configuration of member for displaying projected image | | Glass Cholesteric liquid crystal dot film Glass | Glass Half mirror Glass | Glass Dalid screen Glass | Glass Polyvinyl butyral Glass |
| Normalized luminance | Specular reflection light | 100 | 100 | 95 | 21 |
| | Light at 45° | 53 | 0.5 | 42 | 0.5 |
| Haze [%] | | 7 | 2 | 29 | 0.5 |

The results of sensory evaluation performed through visual observation are described below.

In Example 1, the visibility of the projected image was high even in directions other than the specular reflection direction. Further, the image was able to be visually recognized without blurring of the background scenery.

In Comparative Example 1, the projected image was not able to be visually recognized in directions other than the specular reflection direction in spite of the transparency.

In Comparative Example 2, the visibility of the projected image was high even in directions other than the specular reflection direction, but the background scenery was visually recognized to be blurred.

In Comparative Example 3, the visibility of the projected image was low in any directions. The background scenery was able to be visually recognized without blurring.

As described above, the effectiveness of the present invention became evident from the results of the evaluation.

The present invention can be applied to a member for displaying a projected image and a projection system.

EXPLANATION OF REFERENCES

1: first base material
2: second base material
3: optical member
4: projector
5: observer
10: member for displaying projected image
20: projection system
31: overcoat layer
32R: red reflection cholesteric liquid crystal dot
32G: green reflection cholesteric liquid crystal dot
32B: blue reflection cholesteric liquid crystal dot
33: ground layer
34: substrate
35: pressure sensitive adhesive layer

What is claimed is:

1. A member for displaying a projected image, comprising:
   a first base material;
   a second base material; and
   at least one optical member,
   wherein the at least one optical member is disposed on a surface of the first base material or the second base material, the at least one optical member includes a plurality of cholesteric liquid crystal dots that are separated from, and not in contact with, each other and that are provided on a substrate, the cholesteric liquid crystal dot is formed of a liquid crystal material having a cholesteric structure, the cholesteric structure imparts a striped pattern formed of bright portions and dark portions in a cross-sectional image of the cholesteric liquid crystal dot taken by a scanning electron microscope in a direction perpendicular to the substrate, the cholesteric liquid crystal dot includes a portion where the height thereof successively increases to the maximum height thereof from an end portion toward the center thereof, an angle between a normal line with respect to a line formed by the first dark portion from the surface of the cholesteric liquid crystal dot on a side opposite to the substrate and a line representing the surface of the cholesteric liquid crystal dot is in a range of 70° to 90° in the portion of the cross-sectional image, a reflection center wavelength of the cholesteric liquid crystal dot is in a range of 400 to 1000 nm, the member for displaying a projected image is windshield glass, the at least one optical member is disposed between the first base material and the second base material, both of the first base material and the second base material are glass, and the substrate is a resin film.

2. The member for displaying a projected image according to claim 1, which is used as a combiner of a head-up display.

3. A projection system comprising:
the member for displaying a projected image according to claim 2,
wherein the cholesteric liquid crystal dots are disposed on a side where projection light is incident.

4. Windshield glass comprising the member for displaying a projected image according to claim 1.

5. A combiner of a head-up display, consisting of the member for displaying a projected image according to claim 1.

6. A projection system comprising:
the member for displaying a projected image according to claim 1,
wherein the cholesteric liquid crystal dots are disposed on a side where projection light is incident.

7. The member for displaying a projected image according to claim 1, wherein all cholesteric liquid crystal dots are separated from, and not in contact with, each other.

* * * * *